United States Patent
Seo et al.

(10) Patent No.: US 9,504,027 B2
(45) Date of Patent: Nov. 22, 2016

(54) METHOD AND APPARATUS FOR TRANSMITTING A CONTROL CHANNEL AND A DATA CHANNEL IN A WIRELESS COMMUNICATION SYSTEM

(75) Inventors: Inkwon Seo, Anyang-si (KR); Hanbyul Seo, Anyang-si (KR); Byounghoon Kim, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 152 days.

(21) Appl. No.: 13/884,928

(22) PCT Filed: Nov. 25, 2011

(86) PCT No.: PCT/KR2011/009084
§ 371 (c)(1),
(2), (4) Date: May 10, 2013

(87) PCT Pub. No.: WO2012/070914
PCT Pub. Date: May 31, 2012

(65) Prior Publication Data
US 2013/0230013 A1    Sep. 5, 2013

Related U.S. Application Data

(60) Provisional application No. 61/417,275, filed on Nov. 25, 2010, provisional application No. 61/424,034, filed on Dec. 16, 2010.

(51) Int. Cl.
| | |
|---|---|
| *H04W 72/04* | (2009.01) |
| *H04L 27/26* | (2006.01) |
| *H04J 11/00* | (2006.01) |
| *H04L 5/00* | (2006.01) |
| *H04W 72/08* | (2009.01) |

(52) U.S. Cl.
CPC ........ *H04W 72/042* (2013.01); *H04J 11/0053* (2013.01); *H04L 5/0035* (2013.01); *H04L 27/2602* (2013.01); *H04W 72/082* (2013.01)

(58) Field of Classification Search
None
See application file for complete search history.

(56) References Cited

U.S. PATENT DOCUMENTS

| | | | |
|---|---|---|---|
| 8,724,562 B2 * | 5/2014 | Ji et al. ................... | 370/329 |
| 2008/0232495 A1 | 9/2008 | Yu et al. | |
| 2009/0257394 A1 | 10/2009 | Chun et al. | |
| 2009/0286562 A1 * | 11/2009 | Gorokhov ............ | H04B 7/0617 455/501 |
| 2010/0080166 A1 * | 4/2010 | Palanki et al. ................ | 370/315 |
| 2010/0091708 A1 | 4/2010 | Nishikawa et al. | |

(Continued)

FOREIGN PATENT DOCUMENTS

KR    10-2010-0048496    5/2010

OTHER PUBLICATIONS

PCT International Application No. PCT/KR2011/009084, Written Opinion of the International Searching Authority dated May 16, 2012, 17 pages.

*Primary Examiner* — Huy D Vu
*Assistant Examiner* — Hong Shao
(74) *Attorney, Agent, or Firm* — Lee, Hong, Degerman, Kang & Waimey

(57) ABSTRACT

The present invention relates to a wireless communication system, and more particularly, to a method and apparatus for transmitting a control channel in a wireless communication system that supports multi-cell cooperative communication. According to the present invention, a scheme for protecting a control channel and a data channel of one cell from interference caused by another cell is provided.

12 Claims, 22 Drawing Sheets

(56) References Cited

U.S. PATENT DOCUMENTS

2010/0165847 A1* 7/2010 Kamuf et al. ............... 370/241
2011/0044259 A1* 2/2011 Nimbalker et al. ......... 370/329
2011/0170496 A1* 7/2011 Fong et al. .................. 370/329
2011/0286349 A1* 11/2011 Tee et al. .................... 370/252
2012/0122472 A1* 5/2012 Krishnamurthy et al. 455/456.1

* cited by examiner

FIG. 5
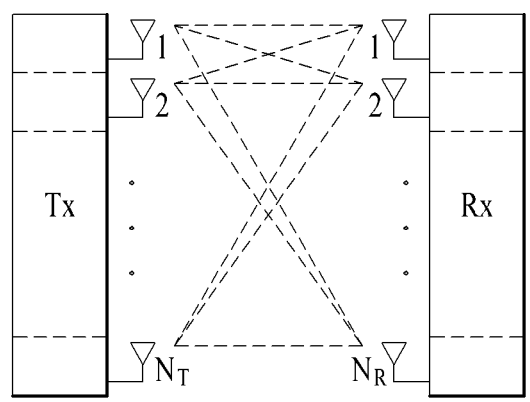
(a)
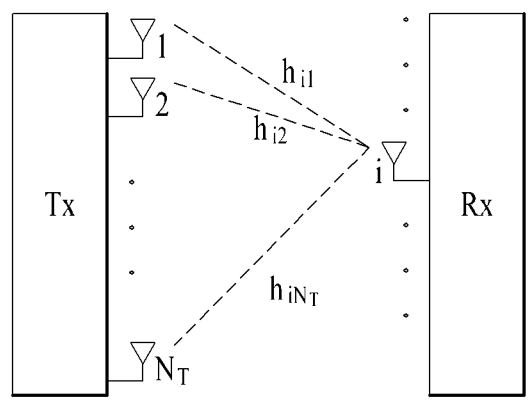
(b)

FIG. 6
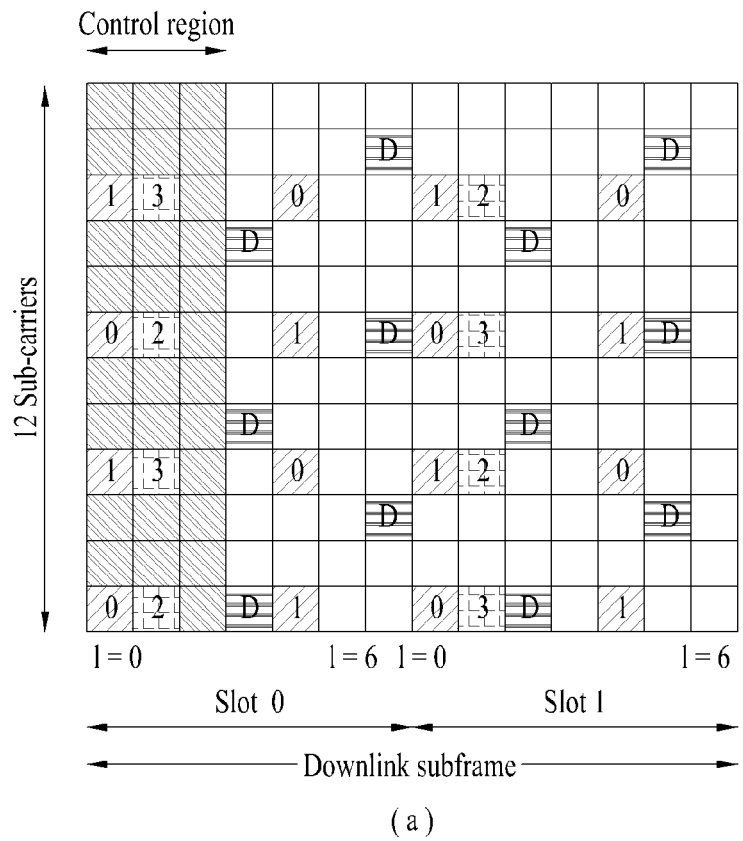
(a)
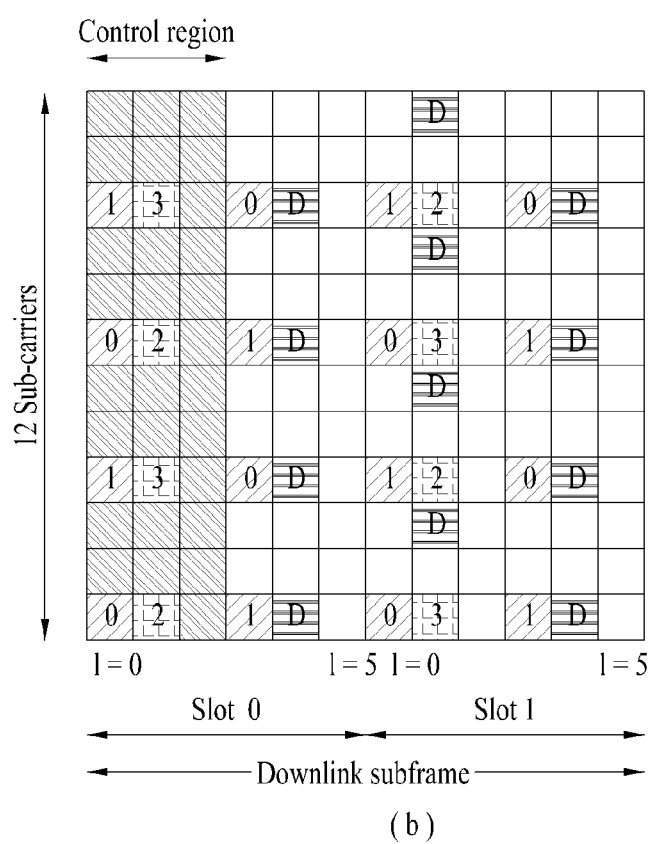
(b)

FIG. 10
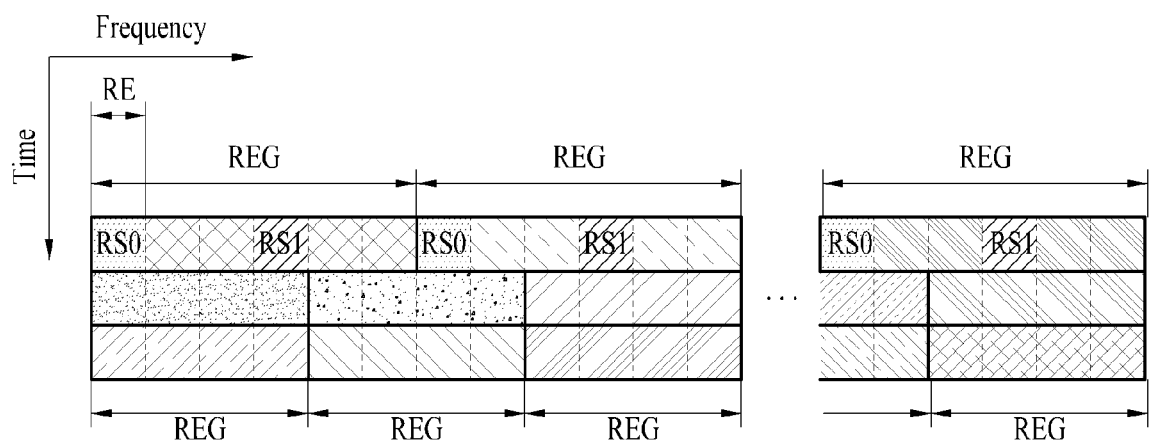
(a)
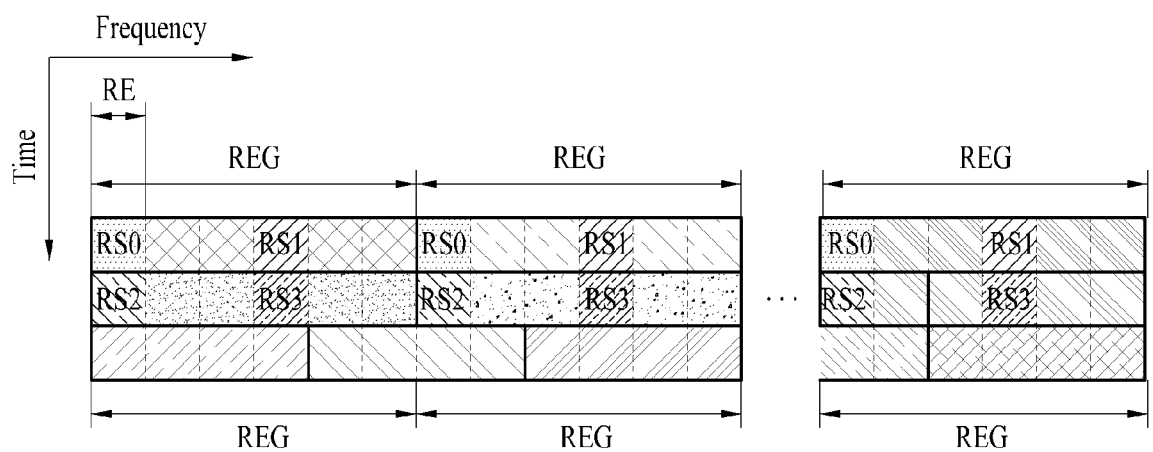
(b)

FIG. 16
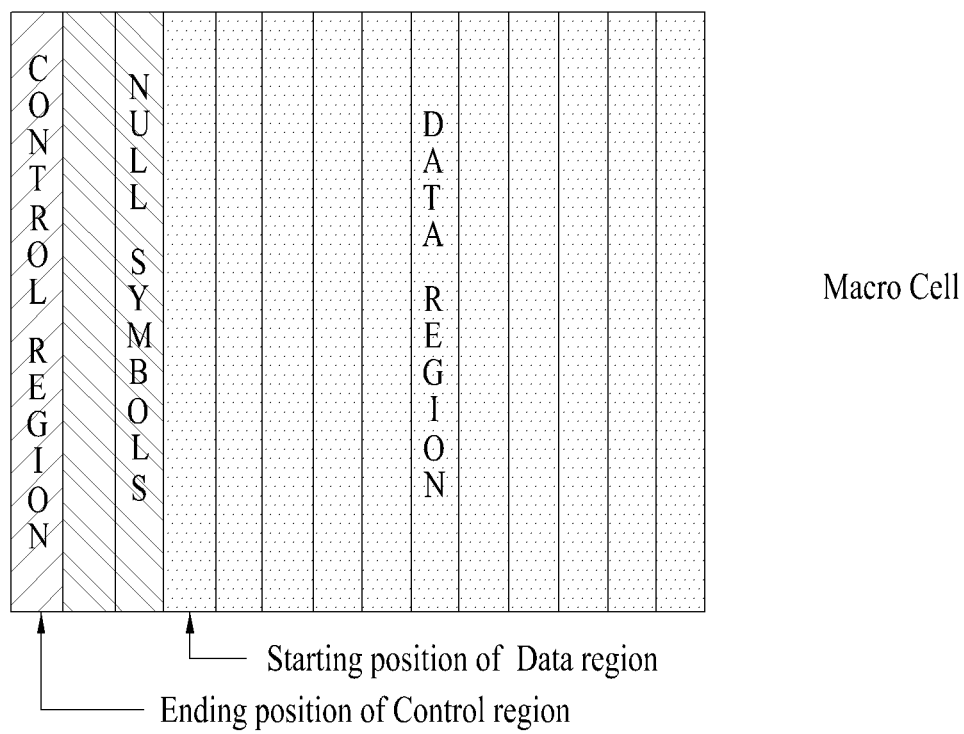
Macro Cell
Starting position of Data region
Ending position of Control region
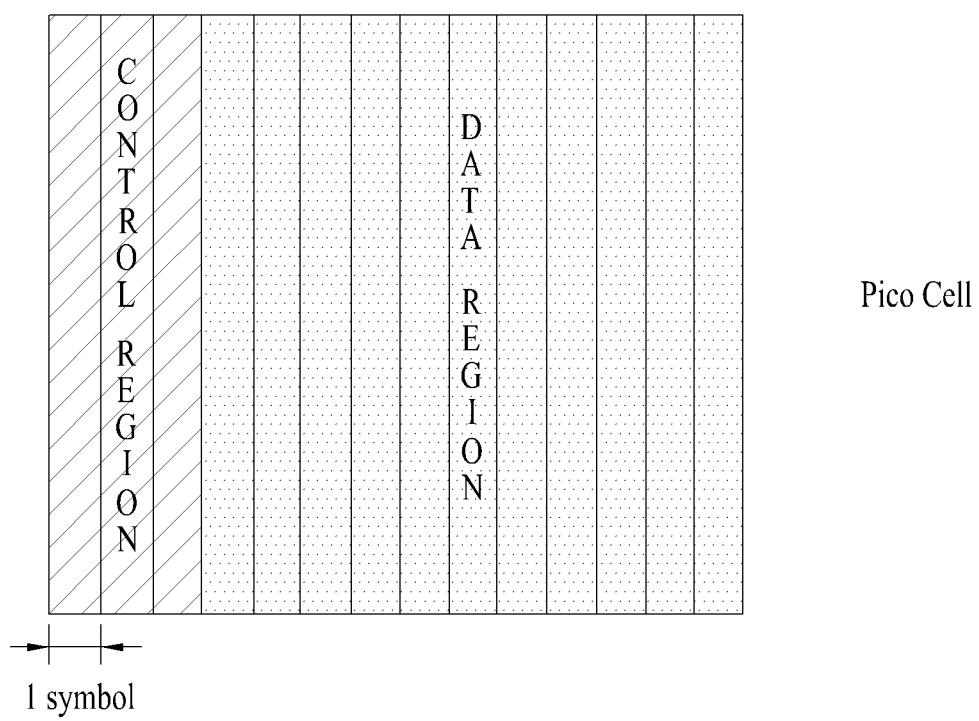
Pico Cell
1 symbol FIG. 20
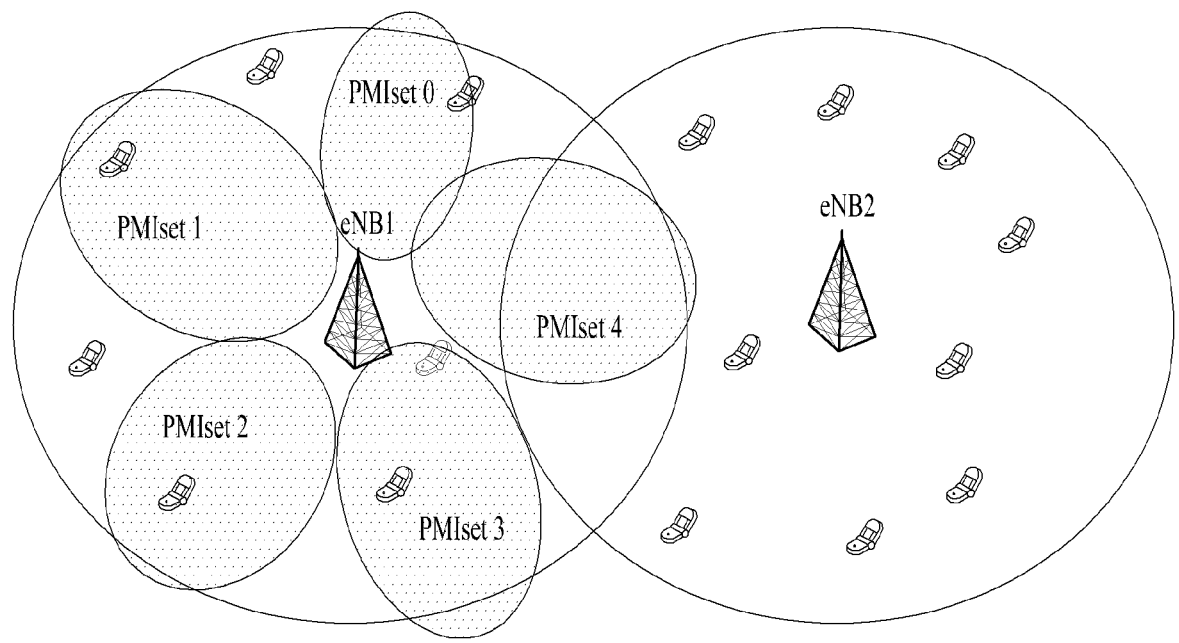
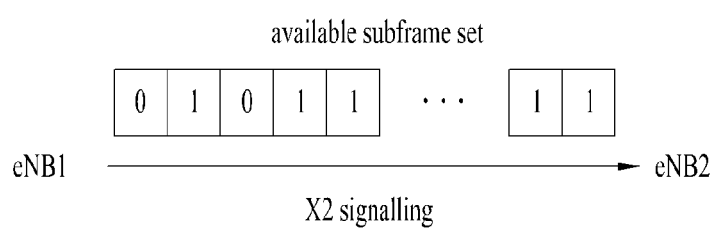
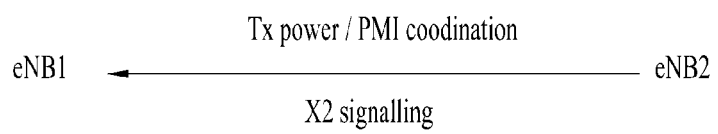

METHOD AND APPARATUS FOR TRANSMITTING A CONTROL CHANNEL AND A DATA CHANNEL IN A WIRELESS COMMUNICATION SYSTEM

CROSS-REFERENCE TO RELATED APPLICATIONS

This application is the National Stage filing under 35 U.S.C. 371 of International Application No. PCT/KR2011/009084, filed on Nov. 25, 2011, which claims the benefit of U.S. Provisional Application Ser. No. 61/417,275, filed on Nov. 25, 2010, and U.S. Provisional Application Ser. No. 61/424,034, filed on Dec. 16, 2010, the contents of which are all hereby incorporated by reference herein in their entirety.

TECHNICAL FIELD

The present invention relates to a wireless communication system, and more particularly, to a method and apparatus for transmitting a control channel and a data channel in a wireless communication system.

BACKGROUND ART

In an advanced wireless communication system, inter-cell interference may be generated when a plurality of cells are arranged. To cope with the inter-cell interference, methods for inter-cell interference coordination (ICIC) are taken into consideration. For instance, it is able to apply a method of restricting a transmission of a cell causing interference onto a specific resource (e.g., a time resource and/or a frequency resource), a method of coordinating a beam direction of an interfering cell, and the like.

Yet, even if a transmission of an interfering cell is restricted, interference with a neighboring cell may still occur on a resource from which the transmission of the interfering cell is not restricted. In order to coordinate a beam direction of an interfering cell, restriction on a precoding matrix and the like are available. Yet, since the restriction on a precoding matrix is applicable to a data channel only but is inapplicable to a control channel, interference with a control channel and/or a data channel of another cell may be caused by the control channel of the interfering cell.

However, although ICIC is applied, it is likely to happen that a control channel provided by a service cell collides with a control channel or a data channel from a neighboring cell. If a user equipment fails in receiving the control channel of the service cell correctly, a transceiving operation may not be correctly performed on the corresponding user equipment.

DISCLOSURE OF THE INVENTION

Technical Task

The technical task of the present invention is to provide a method of protecting a control channel and a data channel of a specific cell from interference of another cell in case that a plurality of cells perform cooperated communications to coordinate inter-cell interference.

Technical tasks obtainable from the present invention are non-limited the above-mentioned technical task. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of performing a downlink transmission, which is performed by a base station, according to one embodiment of the present invention may include the steps of mapping at least one of a downlink control channel and a downlink data channel to a downlink subframe including a control region, a data region and a null region and transmitting at least one of the downlink control channel and the downlink data channel mapped to the downlink subframe to a user equipment, wherein the null region corresponds to a portion or all of a control region of a downlink subframe of a neighboring base station and wherein information for determining a position of the null region is provided to the user equipment.

To further achieve these and other advantages and in accordance with the purpose of the present invention, a method of performing a downlink reception, which is performed by a user equipment, according to another embodiment of the present invention may include the steps of receiving information for determining a position of a null region in a downlink subframe including a control region, a data region and the null region from a base station, receiving at least one of a downlink control channel and a downlink data channel mapped to the downlink subframe from the base station, and decoding at least one of the received downlink control channel and the received downlink data channel, wherein the null region corresponds to a portion or all of a control region of a downlink subframe of a neighboring base station.

To further achieve these and other advantages and in accordance with the purpose of the present invention, a base station, which performs a downlink transmission, according to a further embodiment of the present invention may include a receiving module configured to receive an uplink signal from a user equipment, a transmitting module configured to transmit a downlink signal to the user equipment, and a processor configured to control the base station including the receiving module and the transmitting module, the processor configured to map at least one of a downlink control channel and a downlink data channel to a downlink subframe including a control region, a data region and a null region, the processor configured to transmit at least one of the downlink control channel and the downlink data channel mapped to the downlink subframe to a user equipment via the transmitting module, wherein the null region corresponds to a portion or all of a control region of a downlink subframe of a neighboring base station and wherein information for determining a position of the null region is provided to the user equipment.

To further achieve these and other advantages and in accordance with the purpose of the present invention, a user equipment, which performs a downlink reception, according to another further embodiment of the present invention may include a receiving module configured to receive a downlink signal from a base station, a transmitting module configured to transmit an uplink signal to the base station, and a processor configured to control the user equipment including the receiving module and the transmitting module, the processor configured to receive information for determining a position of a null region in a downlink subframe including a control region, a data region and the null region from a base station via the receiving module, the processor configured to receive at least one of a downlink control channel and a downlink data channel mapped to the downlink subframe from the base station via the receiving module, the processor configured to decode at least one of the received downlink control channel and the received downlink data channel, wherein the null region corresponds to a portion or all of a control region of a downlink subframe of a neighboring base station.

The following matters may be applicable in common to the above-mentioned embodiments of the present invention.

Preferably, at least one of the control region and the data region of the downlink subframe of the base station may include the null region and the null region may include at least one or more contiguous OFDM (orthogonal frequency division multiplexing) symbols.

Preferably, the information for determining the position of the null region may include at least one of information on an end position of the control region and a length of the null region, information on the end position of the control region and a start position of the data region and information on the start position of the data region and the length of the null region.

More preferably, at least one of the end position of the control region, the start position of the data region and the length of the null region may be determined from the information transmitted to the user equipment via PCFICH (physical control format indicator channel), PHICH (physical hybrid automatic repeat request indicator channel), or higher layer signaling.

Preferably, CCE (control channel element), to which resource elements corresponding to the control region of the neighboring base station belong, among resource elements having PDDCH (physical downlink control channel) of the base station mapped thereto may be nullified or the resource elements corresponding to the control region of the neighboring base station among the resource elements having the PDCCH of the base station mapped thereto may be punctured or nullified.

Preferably, the null region may include all of the control region of the downlink subframe of the base station. More preferably, control information for a data transmission of the downlink subframe of the base station may be transmitted on a control channel transmitted in the data region. More preferably, control information for a data transmission of the downlink subframe of the base station may be transmitted on a control channel transmitted in another downlink subframe of the base station.

Preferably, the control region may correspond to first 1-, 2- or 3-OFDM symbol duration of the downlink subframe and the data region may correspond to the rest of OFDM symbol durations in the downlink subframe except the control region.

Preferably, the base station may include a base station of an interfering cell and the neighboring base station may include a base station of an interfered cell. Preferably, the base station may include a base station of an interfered cell and the neighboring base station may include a base station of an interfering cell.

Preferably, information on positions of the control region, the data region and the null region of the downlink subframe of each of the base station and the neighboring base station may be exchanged between the base station and the neighboring base station.

The above-mentioned general description of the present invention and the following details of the present invention are exemplary and may be provided for the additional description of the invention disclosed in the appended claims.

Advantageous Effects

According to the present invention, a method of protecting a control channel and a data channel of a specific cell from interference of another cell can be provided.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 5 is a diagram for a configuration of a wireless communication system having multiple antennas.

FIG. 6 is a diagram of CRS and DRS patterns defined in the legacy 3GPP LTE system.

FIG. 10 is a diagram to describe a resource element group (REG) to which downlink control channels are assigned.

FIGS. 16 to 19 are diagrams to illustrate subframe configurations according to examples of the present invention.

FIG. 20 is a diagram to describe one example of an inter-cell interference coordination performed network to which the present invention is applicable.

BEST MODE FOR INVENTION

Figure 1:
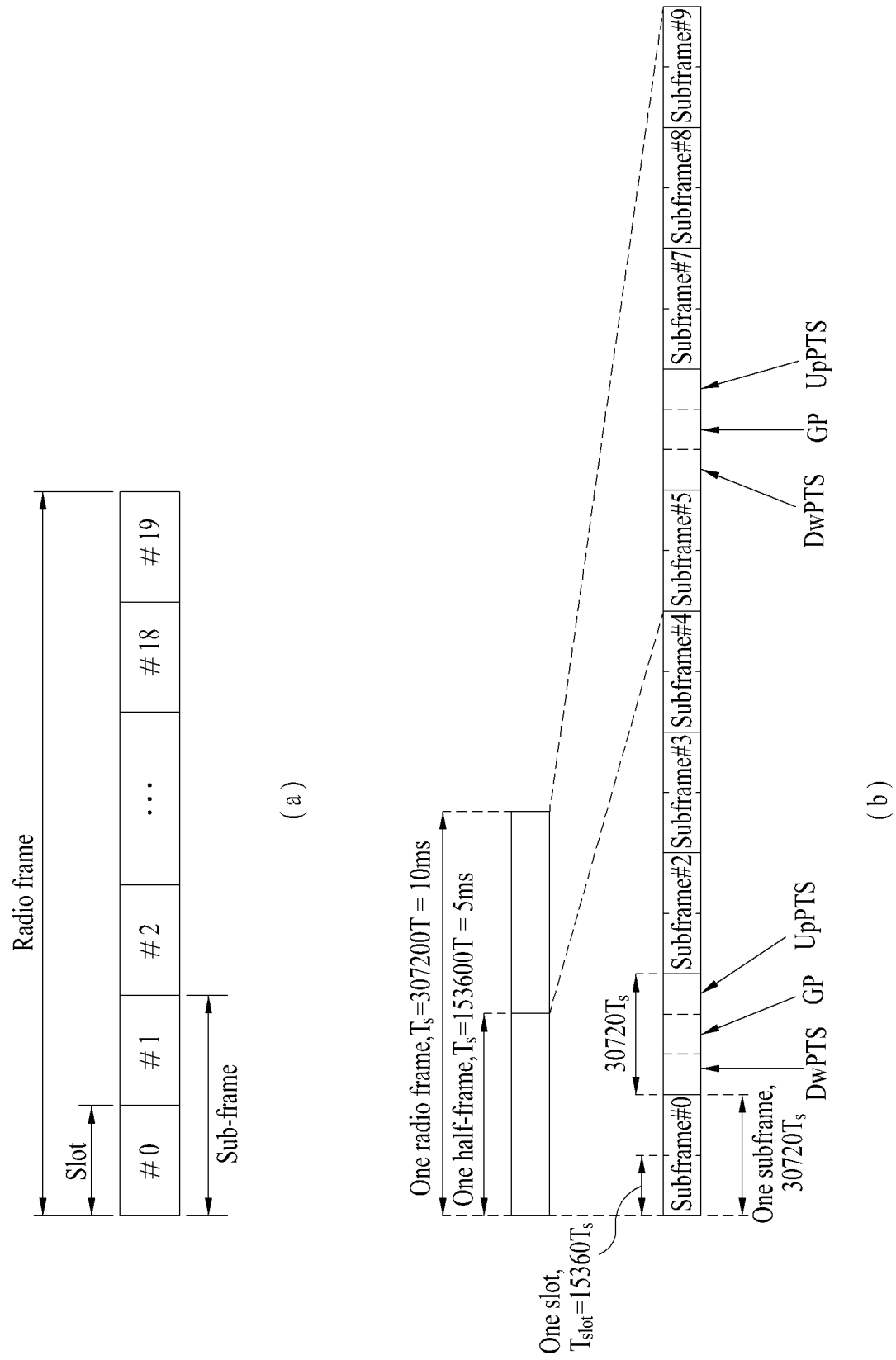
FIG. 1 is a diagram for a structure of a downlink radio frame.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In the present specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by a higher node of the base station in some cases.

In particular, in a network constructed with a plurality of network nodes including a base station, it is apparent that various operations performed for communication with a terminal can be performed by a base station or other networks other than the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into another form within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE system or 3GPP LTE-A system, by which the technical idea of the present invention may be non-limited.

A structure of a downlink (DL) radio frame is described with reference to FIG. 1 as follows.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 1 (a) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain or may include a plurality of resource blocks (RBs) in frequency domain. Since 3GPP system uses OFDMA in downlink, OFDM symbol indicates one symbol duration. The OFDM symbol may be named SC-FDMA symbol or symbol duration. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1 (b) is a diagram for a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink. Meanwhile, one subframe is constructed with 2 slots irrespective of a type of a radio frame.

The above-described structures of the radio frame are just exemplary. And, the number of subframes included in a radio frame, the number of slots included in the subframe and the number of symbols included in the slot may be modified in various ways.

Figure 2:
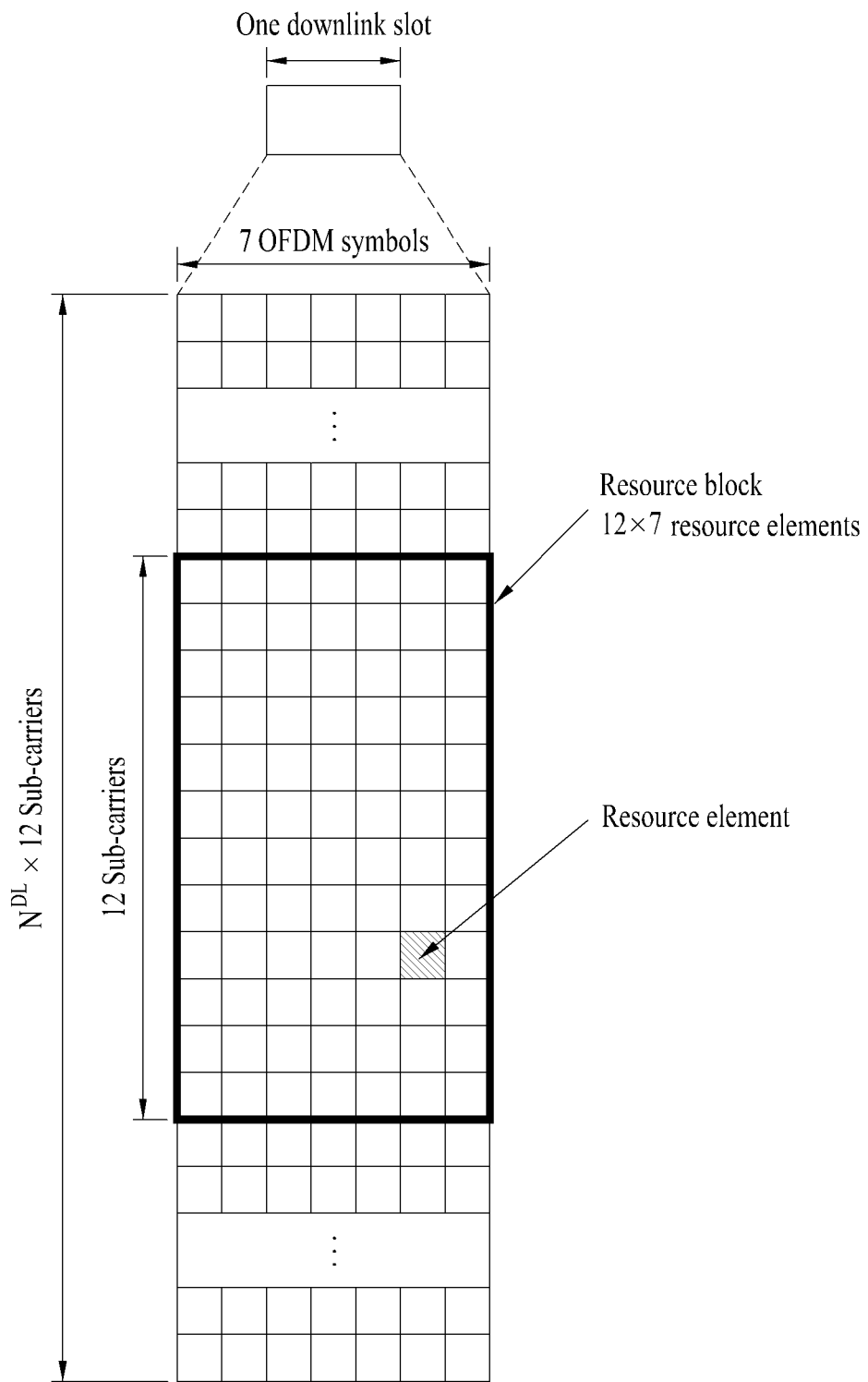
FIG. 2 is a diagram of a resource grid in a downlink slot.

FIG. 2 is a diagram for one example of a resource grid in a downlink (DL) slot. In the drawing, one DL slot may include 7 OFDM symbols in time domain and one resource block (RB) may include 12 subcarriers in frequency domain, by which the present invention may be non-limited. For instance, in case of a normal CP (cyclic prefix), one slot includes 7 OFDM symbols. Yet, in case of an extended CP (extended-CP), one slot may include 6 OFDM symbols. Each element on a resource grid may be called a resource element (RE). One resource block includes 12×7 resource elements. $N^{DL}$ indicates the number of resource blocks included in a DL slot. And, the value of the $N^{DL}$ may depend on a DL transmission bandwidth. A structure of UL slot may be identical to that of the DL slot.

Figure 3:
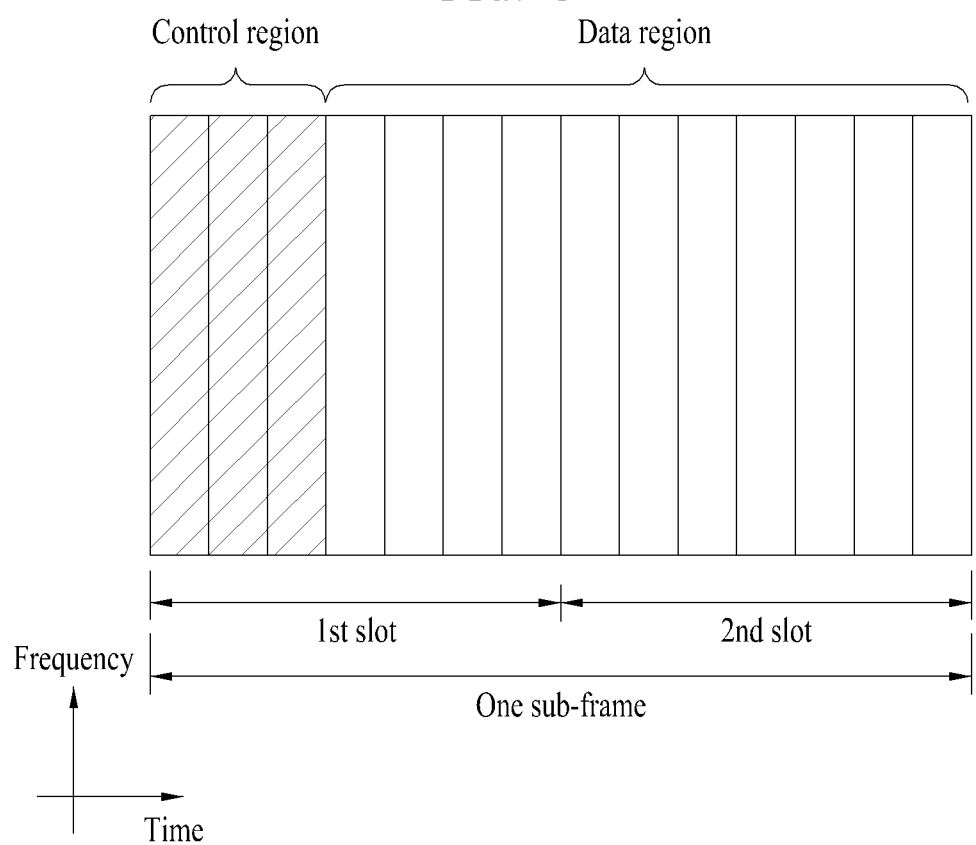
FIG. 3 is a diagram for one example of a structure of a downlink subframe.

FIG. 3 is a diagram for a structure of a downlink (DL) subframe. Maximum 3 OFDM symbols situated in a head part of a first slot of one subframe correspond to a control region to which a control channel is allocated. The rest of OFDM symbols correspond to a data region to which PDSCH (physical downlink shared channel) is allocated. DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission. Control information carried on PDCCH may be called downlink control information (DCI). The DCI may include UL or DL scheduling information or a UL transmission power control command for a random UE (user equipment) group. The PDCCH may include transmission format and resource allocation information of DL-SCH (downlink shared channel), resource allocation information on UL-SCH (uplink shared channel), paging information on PCH (paging channel), system information on DL-SCH, resource allocation of such a higher layer control message as a random access response transmitted on PDSCH, transmission power control command set for individual UEs within a random UE group, transmission power control information, activation of VoIP (voice over IP) and the like. A plurality of PDCCHs can be transmitted within the control region. A user equipment can monitor a plurality of the PDCCHs. The PDCCH is transmitted as an aggregation of at least one or more contiguous CCEs (control channel elements). The CCE is a logical allocation unit used to provide the PDCCH at a coding rate based on a radio channel status. The CCE may correspond to a plurality of REGs (resource element groups). A format of the PDCCH and the number of available PDCCH bits may be determined in accordance with correlation between the number of CCEs and a coding rate provided by the CCE. The number of CCEs used for a PDCCH transmission is called a CCE aggregation level. And, the CCE aggregation level is a CCE unit for searching for PDCCH. A size of the CCE aggregation level is defined as the number of contiguous CCEs. For instance, the CCE aggregation level may be set to one of 1, 2, 4 and 8.

A base station determines a PDCCH format in accordance with a DCI which is to be transmitted to a user equipment and attaches a CRC (cyclic redundancy check) to control information. The CRC is masked with an identifier named RNTI (radio network temporary identifier) in accordance with an owner or usage of the PDCCH. For instance, if the PDCCH is provided for a specific user equipment, the CRC may be masked with an identifier (e.g., cell-RNTI (C-RNTI)) of the corresponding user equipment. In case that the PDCCH is provided for a paging message, the CRC may be masked with a paging indicator identifier (e.g., P-RNTI). If the PDCCH is provided for system information (particularly, for a system information block (SIC)), the CRC may be masked with a system information identifier and a system information RNTI (SI-RNTI). In order to indicate a random access response to a transmission of a random access preamble of a user equipment, the CRC may be masked with RA-RNTI (random access-RNTI).

Figure 4:
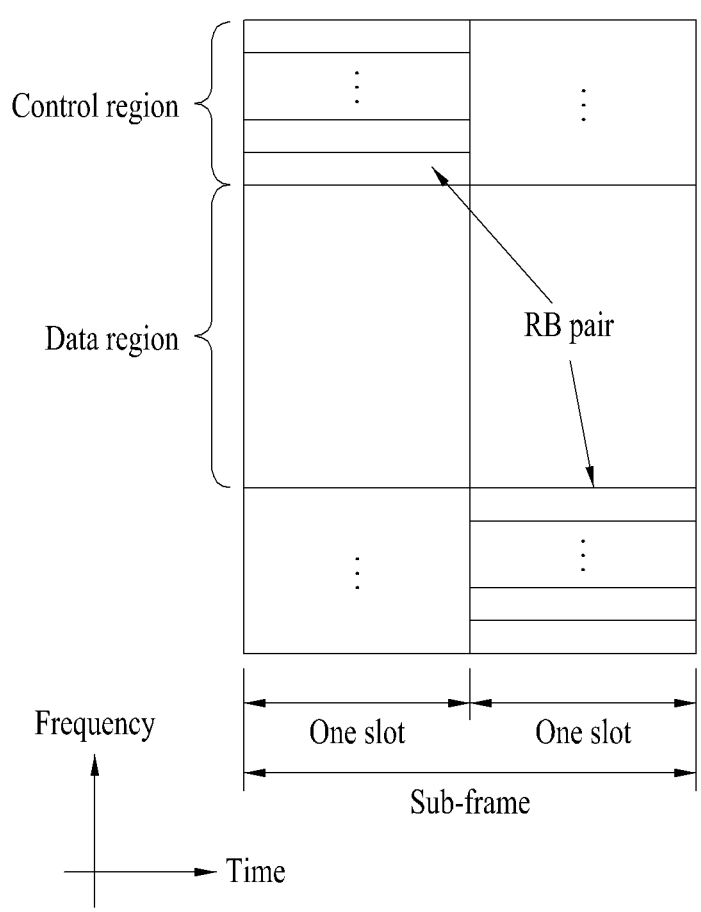
FIG. 4 is a diagram for a structure of an uplink subframe.

FIG. 4 is a diagram for a structure of an uplink UL) subframe. A UL subframe may be divided into a control region and a data region in frequency domain. A physical UL control channel (PUCCH) including UL control information may be allocated to the control region. And, a physical UL shared channel (PUSCH) including user data may be allocated to the data region. In order to maintain single carrier property, one user equipment does not transmit PUCCH and PUSCH simultaneously. PUCCH for one user equipment may be allocated to a resource block pair (RB pair) in subframe. Resource blocks belonging to the resource block pair may occupy different subcarriers for 2 slots. Namely, a resource block pair allocated to PUCCH is frequency-hopped on a slot boundary.

Modeling of Multi-Antenna (MIMO) System

FIG. 5 is a diagram for a configuration of a wireless communication system including multiple antennas.

Referring to FIG. 5 (a), if the number of transmitting antennas is incremented into $N_T$ and the number of receiving antennas is incremented into $N_R$, theoretical channel transmission capacity is increased in proportion to the number of antennas unlike the case that a transmitter or receiver uses a plurality of antennas. Hence, a transmission rate may be enhanced and frequency efficiency may be remarkably raised. The transmission rate according to the increase of the channel transmission capacity may be theoretically raised by an amount resulting from multiplying a maximum transmission rate Ro of the case of using a single antenna by a rate increasing rate $R_i$.

$$R_i = \min(N_T, N_R) \qquad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many efforts are ongoing to be made to various techniques for drive it into substantial data rate improvement. Some of these techniques are already adopted as standards for various wireless communications such as 3G mobile communications, a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Assume that $N_T$ transmitting antennas and $N_R$ receiving antennas exist in this system.

First of all, a transmission signal is explained. If there are $N_T$ transmitting antennas, $N_T$ maximum transmittable informations exist. Hence, the transmission information may be represented as follows.

$$s=[s_1, s_2, \ldots, s_{N_T}]^T \qquad \text{[Formula 2]}$$

Meanwhile, transmission power can be set different for each transmission information $s_1, s_2, \ldots, s_{N_T}$. If the respective transmission powers are set to $P_1, P_2, \ldots, P_{N_T}$, the transmission power adjusted transmission information may be represented as follows.

$$\hat{s}=[\hat{s}_1, \hat{s}_2, \ldots, \hat{s}_{N_T}]^T=[P_1 s_1, P_2 s_2, \ldots, P_{N_T} s_{N_T}]^T \qquad \text{[Formula 3]}$$

And, $\hat{S}$ may be represented as follows using a transmission power diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Formula 4]}$$

If a weight matrix W is applied to the transmission power adjusted transmission information vector $\hat{S}$, a case of configuring $N_T$ transmission signals $x_1, x_2, \ldots, x_{N_T}$ actually transmitted can be taken into consideration as follows. In this case, the weight matrix W plays a role in properly distributing each transmission information to each antenna according to a transmission channel status and the like. The $x_1, x_2, \ldots, x_{N_T}$ may be represented using a vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \qquad \text{[Formula 5]}$$

$$= W\hat{s} = WPs$$

In Formula 5, $w_{ij}$ indicates a weight between an $i^{th}$ transmitting antenna and a $j^{th}$ information. And, W may be called a precoding matrix.

When $N_R$ receiving antennas exist, if reception signals of the receiving antennas are set to $y_1, y_3, \ldots, y_{N_R}$, a reception signal vector can be represented as follows.

$$y=[y_1, y_2, \ldots, y_{N_R}]^T \qquad \text{[Formula 6]}$$

If a channel is modeled in MIMO wireless communication system, the channel can be represented as an index of a transmitting antenna and an index of a receiving antenna.

A channel between a transmitting antenna j and a receiving antenna i may be represented as $h_{ij}$. In the $h_{ij}$, it should be noted that a receiving antenna index is followed by a transmitting antenna index in order of index.

FIG. 5 (b) shows a channel to a receiving antenna i from each of $N_T$ transmitting antennas. These channels may be represented as a vector or matrix in a manner of tying the channels b together. Referring to FIG. 5 (b), the channels between the receiving antenna i and the $N_T$ transmitting antennas can be represented as follows.

$$h_i^T=[h_{i1}, h_{i2}, \ldots, h_{iN_T}] \qquad \text{[Formula 7]}$$

Hence, al the channels arriving from $N_T$ transmitting antennas to $N_R$ relieving antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \qquad \text{[Formula 8]}$$

In an actual channel, a transmission signal passes through a channel matrix H and then has AWGN (additive white Gaussian noise) added thereto. If white noises $n_1, n_2, \ldots, n_{N_R}$ respectively added to $N_R$ receiving antennas, the white noises $n_1, n_2, \ldots, n_{N_R}$ can be represented as follows.

$$n=[n_1, n_2, \ldots, n_{N_R}]^T \qquad \text{[Formula 9]}$$

Hence, the reception signal vector may be expressed as follows through the above-mentioned formula modeling.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Formula 10]}$$

$$Hx + n$$

Meanwhile, the number of rows/columns of a channel matrix H indicating a channel state is dependent on the number of transmitting/receiving antennas. The number of rows in the channel matrix H is equal to the number $N_R$ of the receiving antennas. The number of columns in the channel matrix H is equal to the number $N_T$ of the transmitting antennas. In particular, the channel matrix H becomes $N_R \times N_T$ matrix.

A rank of matrix is defined as a minimum one of the number of independent rows and the number of independent columns. Hence, it may be impossible for a rank of matrix to become greater than the number of rows or columns. A rank (rank(H)) of a channel matrix H is restricted to the following.

$$\text{Rank}(H) \leq \min(N_T, N_R) \qquad \text{[Formula 11]}$$

For another definition of a rank, when Eigen value decomposition is performed on a matrix, a rank may be defined as the number of Eigen values except 0. Similarly, for a further definition of a rank, when singular value decomposition is performed, a rank may be defined as the number of singular values except 0. Hence, the physical meaning of a rank in a channel matrix may be regarded as a maximum number for sending different informations on a given channel.

Reference Signal (RS)

When a packet is transmitted in a wireless communication system, since the transmitted packet is transmitted on a radio channel, signal distortion may occur in the course of the transmission. In order for a receiving side to correctly receive the distorted signal, distortion in a received signal should be corrected using channel information. In order to acquire the channel information, after a signal known to both a receiving side and a transmitting side has been transmitted, the channel information can be acquired with a degree of distortion on receiving the signal on a channel. This signal may be called a pilot signal or a reference signal.

In case of transmitting or receiving data using MIMO, a channel status between each transmitting antenna and each receiving antenna should be obtained to receive a correct signal. Hence, a separate reference signal needs to be present for each transmitting antenna.

Downlink reference signals may include a common reference signal (CRS) shared with all user equipments in a cell and a dedicated reference signal (DRS) for a specific user equipment only. By these reference signals, information for channel estimation and demodulation can be provided.

A receiving side (e.g., user equipment) estimates a state of a channel from CRS and may be able to feed back such an indicator related to a channel quality as CQI (Channel Quality Indicator), PMI (Precoding Matrix Index) and RI (Rank Indicator) to a transmitting side (e.g., base station). The CRS may be called a cell-specific reference signal. An RS related to feedback of such channel state information (CSI) as CQI/PMI/RI can be separately defined as CSI-RS.

Meanwhile, DRS may be transmitted on a corresponding RE if demodulation of data on PDSCH is necessary. A user equipment many be informed of a presence or non-presence of DRS by a higher layer. In particular, the user may be informed that the DRS is valid only if the corresponding PDSCH is mapped. The DRS may be called a UE-specific reference signal or a demodulation reference signal (DMRS).

FIG. 6 is a diagram to illustrate a pattern in which CRS and DRS defined by the legacy 3GPP LTE system (e.g., Release-8) are mapped on a downlink resource block. The downlink resource block, which is a unit for mapping a reference signal, may be represented as a unit of '1 subframe on time×12 subcarriers on frequency'. In particular, one resource block may have a length of 14 OFDM symbols on time in case of a normal CP [FIG. 6 (a)] or a length of 12 OFDM symbols in case of an extended CP [FIG. 6 (b)].

FIG. 6 shows a position of a reference signal on a resource block in a system having a base station support 4 transmitting antennas. In FIG. 6, resource elements (REs) denoted by 0, 1, 2 and 3 indicate positions of CRS for antenna port indexes 0, 1, 2 and 3, respectively. Meanwhile, a resource element denoted by 'D' in FIG. 7 indicates a position of DRS.

In the following description, CRS is explained in detail.

First of all, CRS is used to estimate a channel of a physical antenna stage. The CRS is a reference signal receivable in common by all user equipments (UEs) in a cell and is distributed over a whole band. The CRS may be used for the purpose of channel state information (CSI) acquisition and data demodulation.

The CRS may be defined in various forms in accordance with antenna configuration. 3GPP LTE (e.g., Release-8) system supports various antenna configurations and a downlink signal transmitting side (e.g., base station) may have three kinds of antenna configurations including a single antenna, 2 transmitting antennas, 4 transmitting antennas and the like. In case that a base station performs a single antenna transmission, a reference signal for a single antenna port is arranged. In case that a base station performs 2-antenna transmission, reference signals for 2 antenna ports are arranged by time division multiplexing and/or frequency division multiplexing. In particular, the reference signals for 2 antenna ports are arranged on different time resources and/or different frequency resources to be discriminated from each other. In case that a base station performs 4-antenna transmission, reference signals for 4 antenna ports are arranged by TDM/FDM. Channel information estimated via CRS by a downlink signal receiving side (e.g., user equipment) may be used for demodulation of data transmitted by such a transmission scheme as Single Antenna Transmission, Transmit diversity, Closed-loop Spatial multiplexing, Open-loop Spatial multiplexing, Multi-User MIMO (MU-MIMO) and the like.

In case that MIMO is supported, when a reference signal is transmitted from a prescribed antenna port, a reference signal is carried at a resource element (RE) position designated by a reference signal pattern but no signal is carried at a resource element (RE) position designated for another antenna port.

A rule for mapping CRS on a resource block follows Formula 12.

$$k = 6m + (v + v_{shift}) \bmod 6 \qquad \text{[Formula 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Formula 12, k indicates a subcarrier index, l indicates a symbol index, and p indicates an antenna port index. $N_{symb}^{DL}$ indicates the number of OFDM symbols of one downlink slot, $N_{RB}^{DL}$ indicates the number of resource blocks allocated to downlink, $n_s$ indicates a slot index, and $N_{ID}^{cell}$ indicates a cell ID. 'mod' means a modulo operation. A position of a reference signal in frequency domain depends on a value of $V_{shift}$. Since the $V_{shift}$ value depends on a cell ID as well, a position of a reference signal has a frequency shift value different per cell.

In particular, a position in frequency domain may be set to differ by being shifted in order to raise channel estimation performance through CRS. For instance, if a reference signal is situated at every 3 subcarriers, a prescribed cell enables the reference signal to be arranged on a subcarrier of 3 k and another cell enables the reference signal to be arranged on a subcarrier of 3 k+1. In viewpoint of one antenna port, a reference signal is arranged by 6-RE interval (i.e., 6-subcarrier interval) in frequency domain and maintains 3-RE interval in frequency domain from an RE on which a reference signal for another antenna port is arranged.

For the CRS, power boosting may be applicable. In this case, the power boosting means that a reference signal is transmitted with higher power in a manner of bringing power not from an RE allocated for the reference signal but from another RE among resource elements (REs) of one OFDM symbol.

A reference signal position in time domain is arranged by a predetermined interval by setting symbol index (l) 0 of each slot to a start point. A time interval is defined different in accordance with a CP length. In case of a normal CP, a reference signal is situated at a symbol index 0 of a slot and a reference signal is situated at a symbol index 4 of the slot. Reference signals for maximum 2 antenna ports are defined on one OFDM symbol. Hence, in case of 4-transmitting antenna transmission, reference signals for antenna ports 0 and 1 are situated at symbol indexes 0 and 4 (or symbol indexes 0 and 3 in case of an extended CP) of a slot, respectively and reference signals for antenna ports 2 and 3 are situated at symbol index 1 of the slot. Yet, frequency positions of the reference signals for the antenna ports 2 and 3 may be switched to each other in a $2^{nd}$ slot.

In order to support spectral efficiency higher than that of the conventional 3GPP LTE (e.g., Release-8) system, it is able to design a system (e.g., LTE-A) system having an extended antenna configuration. For instance, the extended antenna configuration may include an 8-transmitting antenna configuration. In the system having the extended antenna configuration, it may be necessary to support user equipments operating in the conventional antenna configuration. Namely, it may be necessary to support backward compatibility. Hence, it may be necessary to support a reference signal pattern according to the conventional antenna configuration and it may be necessary to design a new reference signal pattern for an additional antenna configuration. In this case, if CRS for a new antenna port is added to a system having a conventional antenna configuration, it is disadvantageous in that a reference signal overhead rapidly increases to lower a data rate. In consideration of this matter, a separate reference signal (CSI-RS) for a channel state information (CSI) measurement for the new antenna port may be introduced into LTE-A (LTE-advanced) system evolved from 3GPP LTE.

In the following description, DRS is explained in detail.

First of all, DRS (or UE-specific reference signal) is a reference signal used for data demodulation. When MIMO transmission is performed, a precoding weight used for a specific user equipment in MIMO transmission is used for a reference signal as it is. Hence, when a user equipment receives a reference signal, it is able to estimate an equivalent channel having a transmission channel combined with the precoding weight transmitted from each transmitting antenna.

The conventional 3GPP LTE system (e.g., Release-8) supports maximum 4-transmitting antenna transmission and DRS for rank 1 beamforming is defined. The DRS for the rank 1 beamforming may be represented as a reference signal for antenna port index 5. A rule for mapping DRS on a resource block may follow Formula 13 and Formula 14. Formula 13 relates to a normal CP, while Formula 14 relates to an extended CP.

$$k = (k') \bmod N_{sc}^{RB} + N_{sc}^{RB} \cdot n_{PRB}$$ [Formula 13]

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB}$$ [Formula 14]

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 0 \end{cases}$$

$$m' = 0, 1, \ldots, 4N_{RB}^{PDSCH} - 1$$

$$v_{shift} = N_{ID}^{cell} \bmod 3$$

In Formula 13 and Formula 14, k indicates a subcarrier index, l indicates a symbol index, and p indicates an antenna port index. $N_{SC}^{RB}$ indicates a resource block size in i frequency domain and may be represented as the number of subcarriers. $n_{PRB}$ indicates a physical resource block number. And, $N_{RB}^{PDSCH}$ indicates a bandwidth of a resource block of a corresponding PDSCH transmission. $n_s$ indicates a slot index and $N_{ID}^{cell}$ indicates a cell ID. Moreover, 'mod' means a modulo operation. A position of a reference signal in frequency domain depends on a value of $V_{shift}$. Since the $V_{shift}$ value depends on a cell ID as well, a position of a reference signal has a frequency shift value different per cell.

Meanwhile, in a system of LTE-A (LTE-Advanced) evolved from 3GPP LTE, MIMO of high order, multi-cell transmission, advanced MU-MIMO and the like are taken into consideration. In order to support efficient reference signal management and advanced transmission scheme, DRS based data demodulation is taken in to consideration. In particular, aside from DRS (antenna port index 5) for the rank 1 beamforming defined by the conventional 3GPP LTE (e.g., Release-8), in order to support data transmission via an added antenna, it is able to define DRS for at least two layers.

Cooperative Multi-Point (CoMP)

In accordance with the advanced system performance requirements of 3GPP LTE-A system, CoMP transmission/reception scheme (represented as one of co-MIMO (collaborative MIMO), network MIMO, etc.) has been proposed. The CoMP technology can enhance performance of a user equipment located at a cell edge and increase average sector throughput as well.

Generally, in a multi-cell environment having a frequency reuse factor set to 1, the performance and average sector throughput of the user equipment located at the cell edge may be lowered due to inter-cell interference (ICI). In order to reduce the ICI, a conventional LTE system has applied a method of providing an appropriate throughput performance to a user equipment located at a cell edge in an environment restricted by interference using a simple passive scheme such as FFR (fractional frequency reuse) via UE-specific power control and the like. Yet, reducing the ICI or reusing the ICI as a signal desired by a user equipment may be more preferable than lowering a frequency resource use per cell. To achieve this object, CoMP transmission schemes may be applicable.

The CoMP schemes applicable to a DL case may be mainly classified into joint processing (JP) scheme and coordinated scheduling/coordinated beamforming (CS/CB) scheme.

The JP scheme can use data at each point (e.g., base station) of CoMP cooperation unit. And, the CoMP cooperation unit may mean a set of base stations used for the cooperative transmission scheme. Moreover, the JP scheme may be classified into a joint transmission scheme and a dynamic cell selection scheme.

The joint transmission scheme means a scheme of transmitting PDSCH from a plurality of points (portion or all of CoMP cooperation unit) at a time. In particular, data transmitted to a single user equipment may be simultaneously from a plurality of transmission points. According to the joint transmission scheme, a quality of a coherently or non-coherently received signal can be improved and interference on another user equipment can be actively eliminated.

The dynamic cell selection scheme means the scheme of transmitting PDSCH from one point (of CoMP cooperation unit) at a time. In particular, data transmitted to a single user equipment at a specific timing point is transmitted from one point, the rest of points in the cooperation unit at that timing point do not perform data transmission to the corresponding user equipment, and a point of transmitting data to the corresponding user equipment may be dynamically selected.

According to the CS/CB scheme, CoMP cooperation units can cooperatively perform beamforming of data transmission to a single user equipment. In this case, although the data is transmitted from a serving cell only, user scheduling/beamforming may be determined by the coordination of cells of the corresponding CoMP cooperation unit.

Meanwhile, in case of uplink, coordinated multi-point reception means that a signal transmitted by coordination of a plurality of points geographically spaced apart from each other is received. CoMP schemes applicable to a case of uplink may be classified into joint reception (JR) and coordinated scheduling/coordinated beamforming (CS/CB).

The JR scheme means that a signal transmitted on PUSCH is received by a plurality of reception points. And, the CS/CB scheme means that user scheduling/beamforming is determined by coordination of cells of CoMP cooperation unit despite that PUSCH is received by one point only.

Sounding Reference Signal (SRS)

Sounding reference signal (SRS) is mainly used for a base station to perform a frequency-selective scheduling in UL by performing a channel quality measurement and is not associated with UL data and/or control information transmission, by which the sounding reference signal is non-limited. And, the SRS may be usable for the purpose of an improved power control or for the purpose of supporting various start-up functions of recently unscheduled user equipments. For example, the start-up functions may include an initial modulation and coding scheme (MCS), an initial power control for data transmission, a timing advance and frequency half-selective scheduling (e.g., a scheduling performed in a manner that a frequency resource is selectively allocated in a $1^{st}$ slot of a subframe but that a frequency resource pseudo-randomly hops into another frequency in a $2^{nd}$ slot of the subframe), and the like.

The SRS may be usable for a DL channel quality measurement on the assumption that a radio channel is reciprocal between UL and DL. This assumption is particularly effective to a TDD (time division duplex) system in which a UL and a DL share the same frequency band with each other but are discriminated from each other in time domain.

A subframe, in which SRS is transmitted by a random user equipment within a cell, is indicated by cell-specific broadcast signaling. A 4-bit cell-specific parameter 'srsSubframeConfiguration' indicates 15 kinds of available configurations of a subframe for transmitting SRS within each radio frame. By this configuration, flexibility for adjusting an SRS overhead in accordance with a network arrangement scenario can be provided. A configuration of a remaining one ($16^{th}$) of the parameter is to completely switch off an SRS transmission within a cell and may be suitable for a cell that mainly serves fast user equipments for example.

Figure 7:
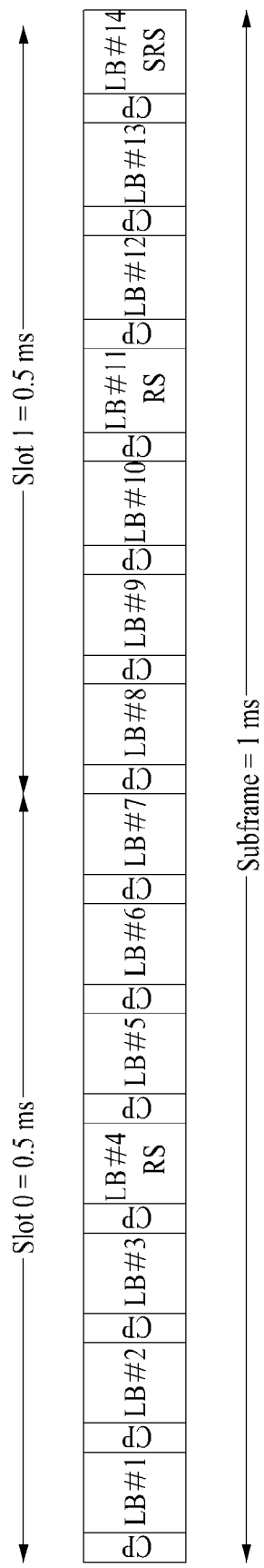
FIG. 7 is a diagram of an uplink subframe structure including SRS symbols.

Referring to FIG. 7, SRS is always transmitted on a last SC-FDMA symbol of a configured subframe. Hence, SRS and DMRS (demodulation reference signal) are located on different SC-FDMA symbols, respectively. PUSCH data transmission is not allowed to be performed on SC-FDMA symbol designated to SRS transmission. Hence, if a sounding overhead is highest (i.e., a case that an SRS transmission symbol exists in every subframe), it does not exceed about 7%.

Each SRS symbol is generated for a given time unit and frequency band by a basic sequence (e.g., a random sequence, a set of ZC-based (Zadoff Chu-based) sequences) and every user equipment within a cell uses the same basic sequence. In doing so, SRS transmissions from a plurality of user equipments within a cell on the same frequency band can be orthogonally identified by different cyclic shifts of the basic sequence assigned to a plurality of the user equipments, respectively. Although an SRS sequence of a different cell may be identifiable by assigning a different basic sequence to each cell, orthogonality between the different basic sequences are not guaranteed.

Relay Node

A relay node can be taken into consideration for an expansion of a fast data rate coverage, an enhancement of group mobility, a temporary network arrangement, an enhancement of a cell boundary throughput, and/or a network coverage offering to a new area.

A relay node plays a role in forwarding transmission and reception between a base station and a user equipment. And, two kinds of links (i.e., a backhaul link and an access link) differing from each other in attributes are applied to carrier frequency bands, respectively. The base station may include a donor cell. And, the relay node is connected by wireless to a wireless-access network via the donor cell.

In case that a backhaul link between the base station and the relay node uses a DL frequency band or DL subframe resource, it may be represented as a backhaul downlink. In case that a backhaul link between the base station and the relay node uses a UL frequency band or UL subframe resource, it may be represented as a backhaul uplink. In this case, the frequency band is a resource allocated in FDD (frequency division duplex) mode and the subframe is a resource allocated in TDD (time division duplex) mode. Similarly, in case that an access link between the relay node and the user equipment(s) uses a DL frequency band or DL subframe resource, it may be represented as an access downlink. In case that an access link between the relay node and the user equipment(s) uses a UL frequency band or UL subframe resource, it may be represented as an access uplink.

A UL reception function and a DL transmission function are necessary for a base station and a UL transmission function and a DL reception function are necessary for a user equipment. On the other hand, a function of a backhaul UL transmission to a base station, a function of an access UL reception from a user equipment, a function of a backhaul DL reception from a base station and a function of an access DL transmission to a user equipment are necessary for a relay node.

Figure 8:
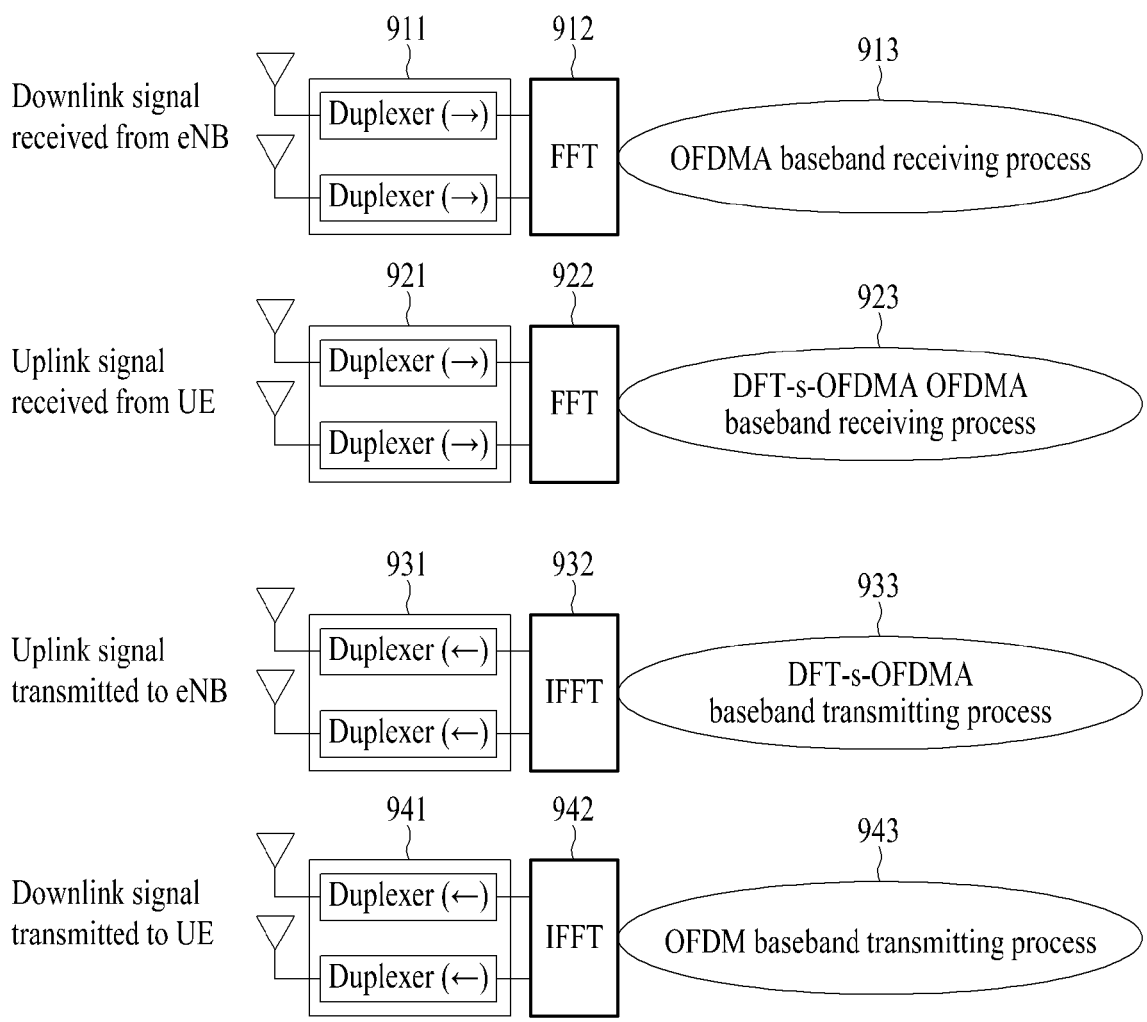
FIG. 8 is a diagram for one example of transceiving unit function implementation of FDD mode relay node.

FIG. 8 is a diagram for one example of transceiving unit function implementation of an FDD mode relay node. A reception function of a relay node is conceptionally explained as follows. First of all, a DL signal received from a base station is forwarded to an FTT (fast Fourier transform) module 912 via a duplexer 911 and an OFDMA baseband reception process 913 is then performed. A UL signal received from a user equipment is forwarded to an FFT module 922 via a duplexer 921 and a DFT-s-OFDMA (discrete Fourier transform-spread-OFDMA) baseband reception process 923 is then performed. The process for receiving a DL signal from a base station and the process for receiving a UL signal from a user equipment may be simultaneously performed in parallel with each other. On the other hand, a transmission function of the relay node is conceptionally explained as follows. First of all, a UL signal transmitted to a base station is transmitted via a DFT-s-OFDMA baseband transmission process 933, an IFFT (inverse FFT) module 932 and a duplexer 931. The process for transmitting the UL signal to the base station and the process for transmitting the DL signal to the user equipment may be simultaneously performed in parallel with each other. And, the duplexers shown in one direction may be implemented into a single bidirectional duplexer. For instance, the duplexer 911 and the duplexer 931 may be implemented into a single bidirectional duplexer. For another instance, the duplexer 921 and the duplexer 941 may be implemented into a single bidirectional duplexer. In particular, the bidirectional duplexer may be implemented in a manner that an IFFT module and baseband process module line associated with transmission/reception on a specific carrier frequency band diverges from a single bidirectional duplexer.

Meanwhile, regarding a use of a band (or spectrum) of a relay node, one case in which a backhaul link operates on the same frequency band of an access link may be referred to as 'in-band', and the other case in which a backhaul link operates on a frequency band different from that of an access link is referred to as 'out-band'. In both of the above-mentioned two cases of the in-band and the out-band, it is necessary for a user equipment (hereinafter named a legacy user equipment) operating in a legacy LTE system (e.g., Release-8) to access a donor cell.

Relay nodes may be classified into a transparent relay node and a non-transparent relay node by depending on whether a user equipment recognizes the relay node. In particular, the 'transparent' may mean a case that a user equipment is unable to recognize whether the user equipment is communicating with a network through a relay node. And, the 'non-transparent' may mean a case that a user equipment is able to recognize whether the user equipment is communicating with a network through a relay node.

Regarding controls of a relay node, relay nodes may be classified into one relay node configured as a part of a donor cell and another relay node capable of controlling a cell by itself.

Although the relay node configured as a part of the donor cell may have a relay node identifier (ID), the relay node does not have a cell identity of its own. If at least one portion of RPM (Radio Resource Management) is controlled by a base station having the donor cell belong thereto (despite that the rest of the RPM is located at the relay node), the above-mentioned relay node may be considered as a relay node (RN) configured as a part of the donor cell. Preferably, this relay node may be able to support a legacy user equipment. For example, smart repeaters, decode-and-forward relays, a variety of L2 ($2^{nd}$ layer) relay nodes, and a type-2 relay node may belong to the category of the above-mentioned relay node.

Regarding a relay node configured to self-control a cell, this relay node controls one or more cells, a unique physical layer cell identity is provided to each cell controlled by the relay node, and the same RPM mechanism may be usable. In aspect of a user equipment, there is no difference between accessing a cell controlled by a relay node and accessing a cell controlled by a general base station. Preferably, a cell controlled by the above-mentioned relay node may be able to support a legacy user equipment. For example, a self-backhauling RN, an L3 ($3^{rd}$ layer) relay node, a type-1 relay node, and a type-1a relay node may belong to the category of the above-mentioned relay node.

The type-1 relay node plays a role as an in-band relay node in controlling a plurality of cells, and a user equipment may consider each of the cells as a separate cell discriminated from a donor cell. Moreover, each of a plurality of the cells has a physical cell ID (defined in LTE Release-8) of its own and the relay node may be able to transmit a synchronization channel of its own, a reference signal and the like. In case of a single-cell operation, a user equipment may directly receive scheduling information and HARQ feedback from a relay node and can transmit a control channel (scheduling request (SR), CQI, ACK/NACK, etc.) of its own to a relay node. Moreover, legacy user equipments (e.g., user equipments operating in LTE Release-8 system) may consider the type-1 relay node as a legacy base station (e.g., a base station operating in the LTE Release-8 system). In particular, the type-1 relay node has backward compatibility. Meanwhile, in aspect of user equipments operating in LTE-A system, the type-1 relay node is considered as a base station different from a legacy base station, whereby performance thereof can be enhanced.

The type-1a relay node operates in the out-band, and has the same features as those of the type-1 relay node. Operation of the type-1a relay node can be configured to minimize (or eliminate) the influence on L1 ($1^{st}$ layer) operation.

The type-2 relay node corresponds to an in-band relay node but has no separate physical cell ID not to form a new cell. The type-2 relay node is transparent to a legacy user equipment and the legacy user equipment is unable to recognize the presence of the type-2 relay node. Although the type-2 relay node is able to transmit PDSCH, it does not transmit CRS and PDCCH at least.

Meanwhile, in order for a relay node to operate in in-band, prescribed resources in time-frequency space must be reserved for a backhaul link and these resources may be configured not be used for an access link. This configuration is called 'resource partitioning'.

The general principles related to the resource partitioning in a relay node may be described as follows. First of all, a backhaul downlink and an access downlink may be multiplexed together on a single carrier frequency by Time Division Multiplexing (TDM) [i.e., either the backhaul downlink or the access downlink is activated in specific time). Similarly, a backhaul uplink and an access uplink may be multiplexed together on a single carrier frequency by TDM [i.e., either the backhaul uplink or the access uplink can be activated in specific time).

Regarding the backhaul link multiplexing by FDD, a backhaul downlink transmission is performed on a downlink frequency band, and a backhaul uplink transmission is performed on an uplink frequency band. Regarding the backhaul link multiplexing by TDD, a backhaul downlink transmission is performed in a downlink subframe of a base station or a relay node, and a backhaul uplink transmission is performed in an uplink subframe of the base station or the relay node.

In case of an in-band relay mode, for example, provided that both a backhaul downlink reception from a base station and an access downlink transmission to a user equipment are simultaneously performed on a prescribed frequency band, a signal transmitted from a transmitting end of a relay node may be received by a receiving end of the relay node, whereby signal interference or RF jamming may occur at an RF front-end of the relay node. Similarly, if both an access uplink reception from a user equipment and a backhaul uplink transmission to a base station are simultaneously performed on a prescribed frequency band, signal interference may occur at the RF front-end of the relay node. Therefore, it may be difficult to implement the simultaneous transmission and reception on a single frequency band at a relay node unless a sufficient separation between a received signal and a transmitted signal is provided [e.g., a transmitting antenna and a receiving antenna are installed in a manner of being sufficiently spaced apart from each other (e.g., installed on/under the ground)].

Figure 9:
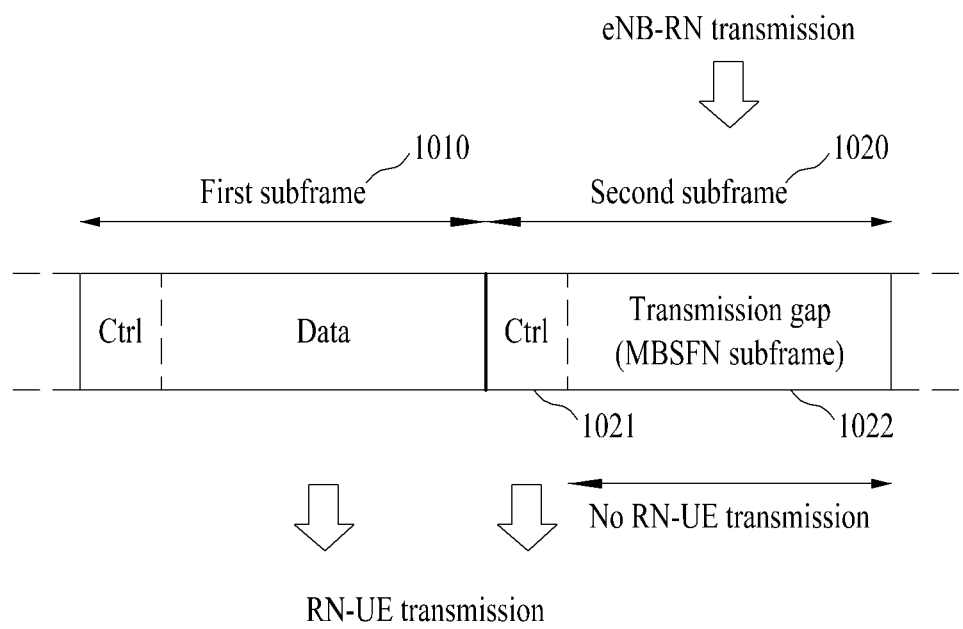
FIG. 9 is a diagram to describe a transmission from a relay node to a user equipment and a downlink transmission from a base station to a user equipment.

As a solution for the above signal interference problem, it may be able to enable a relay node not to transmit a signal to a user equipment while receiving a signal from a donor cell. In particular, a gap is generated in a transmission from the relay node to the user equipment, and the user equipment (e.g., a legacy user equipment, etc.) may be configured not to expect any transmission from the relay node during this gap. Referring to FIG. 9, in a first subframe 1010 that is a normal subframe, a downlink (i.e., an access downlink) control signal and data are transmitted from a relay node to a user equipment. In a second subframe 1020 that is an MBSFN subframe, while a control signal is transmitted from the relay node to the user equipment on a control region 1021 of a downlink subframe but any transmission from the relay node to the user equipment is not performed in the rest region 1022 of the downlink subframe. In doing so, since a legacy user equipment expects a transmission of physical downlink control channel (PDCCH) in all downlink subframes (i.e., the relay node needs to support legacy user equipments within a coverage of the relay node to receive PDCCH in each subframe and to perform a measurement function thereof), it is necessary for the PDCCH to be transmitted in all the downlink subframes in order for each legacy user equipment to operate correctly. Therefore, in a subframe (i.e., the $2^{nd}$ subframe) configured for a downlink (i.e., backhaul downlink) transmission from a base station to a relay node, the relay node needs to perform an access downlink transmission in first N OFDM symbols (N=1, 2 or 3) rather than to receive a backhaul downlink. For this, since PDCCH is transmitted from the relay node to the user equipment in a control region 1021 of the second subframe, it may be able to provide backward compatibility with a legacy user equipment served by the relay node. While no signal is transmitted in the rest region 1022 of the $2^{nd}$ subframe from the relay node, the relay node may be able to receive a transmission from the base station. Therefore, the above-mentioned resource partitioning scheme can prevent the access downlink transmission and the backhaul downlink reception from being simultaneously performed by the in-band relay node.

The $2^{nd}$ subframe 1022, which uses the MBSFN subframe, shall be described in detail as follows. The MBSFN subframe basically includes a subframe for MBMS (multimedia broadcast and multicast service). And, the MBMS means a service of transmitting the same signals from several cells simultaneously. A control region 1021 of the $2^{nd}$ subframe may be referred to as a relay node non-hearing interval. In particular, the relay node non-hearing interval may mean the interval in which a relay node transmits an access downlink signal instead of receiving a backhaul downlink signal. As mentioned in the foregoing description, this relay node non-hearing interval may be configured to have 1-, 2- or 3-OFDM length. In the relay node non-hearing interval 1021, a relay node performs an access downlink transmission to a user equipment and may receive a backhaul downlink from a base station in the rest region 1022. In doing so, since the relay node is unable to perform both transmission and reception on the same frequency band, it may take a time to enable the relay node to be switched from a transmitting mode to a receiving mode. Hence, it may be necessary to configure a guard time (GT) to enable the relay node to perform a transmitting/receiving mode switching in first partial interval of a backhaul downlink receiving region 1022. Similarly, even if the relay node operates in a manner of receiving a backhaul downlink from the base station and transmitting and access downlink to the user equipment, it may be able to configure a guard time (GT) for the transmitting/receiving mode switching of the relay node. The length of the guard time may be defined as a value in time domain. For example, the length of the GT may be defined as k time samples (Ts) (where, k≥1) or may be set to the length of at least one or more OFDM symbols. Alternatively, in case that relay node backhaul downlink subframes are contiguously configured or in accordance with a prescribed subframe timing alignment relation, the guard time of a last part of a subframe may be defined or may not configured. In order to maintain backward compatibility, this guard time may be defined only in a frequency domain configured for a backhaul downlink subframe transmission (i.e., a legacy user equipment is not supportable if a guard time is configured in an access downlink interval). In the backhaul downlink receiving interval 1022 except the guard time, the relay node may be able to receive relay node dedicated PDCCH and PDSCH from the base station. In the meaning of a relay node dedicated physical channel, the PDCCH and the PDSCH may also be represented as R-PDCCH (Relay-PDCCH) and R-PDSCH (Relay-PDSCH), respectively.

Configuration of Downlink Control Channel

As a region for transmitting a downlink control channel, first three OFDM symbols of each subframe are available. In particular, 1 to 3 OFDM symbols are available in accordance with overhead of the downlink control channel. In order to adjust the number of OFDM symbols for a downlink control channel in each subframe, it may be able to use PCFICH. And, it is able to use PHICH to provide an acknowledgment response [ACK/NACK (acknowledgement/negative-acknowledgement)] to an uplink transmission in downlink. Moreover, it is able to use PDCCH to transmit control information for a downlink or uplink data transmission.

FIG. 10 shows that the above-configured downlink control channels are assigned by resource element group (REG) unit in a control region of each subframe. FIG. 10 (a) relates to a system having 1- or 2-Tx antenna configuration and FIG. 10 (b) relates to a system having 4-Tx antenna configuration. Referring to FIG. 10, REG corresponding to a basic resource unit for assigning a control channel is configured with 4 contiguous REs in frequency domain except a resource element for assigning a reference signal. A specific number of REGs are available for a transmission of a downlink control channel in accordance with overhead of the downlink control channel.

PCFICH (Physical Control Format Indicator Channel)

In order to provide every subframe with resource allocation information of the corresponding subframe and the like, it is able to transmit PDCCH between OFDM symbol indexes 0 to 2. In accordance with overhead of a control channel, it may be able to use the OFDM symbol index 0, the OFDM symbol indexes 0 and 1, or the OFDM symbol indexes 0 to 2. Thus, the number of OPFDM symbols used for a control channel is changeable for each subframe. And, information on the OFDM symbol number may be provided via PCFICH. Hence, the PCFICH should be transmitted in every subframe.

Three kinds of informations can be provided through the PCFICH. Table 1 in the following shows CFI (control format indicator) of PCFICH. 'CFI=1' indicates that PDCCH is transmitted on OFDM symbol index 0, 'CFI=2' indicates that PDCCH is transmitted on OFDM symbol indexes 0 and 1, and 'CFI=3' indicates that PDCCH is transmitted on OFDM symbol indexes 0 to 2.

TABLE 1

| CFI | CFI codeword $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Information carried on PCFICH may be defined different in accordance with a system bandwidth. For instance, in case that a bandwidth of a system is smaller than a specific threshold, 'CFI=1' may indicate that 2 OFDM symbols are used for PDCCH. 'CFI=2' may indicate that 3 OFDM symbols are used for PDCCH. And, 'CFI=3' may indicate that 4 OFDM symbols are used for PDCCH.

Figure 11:
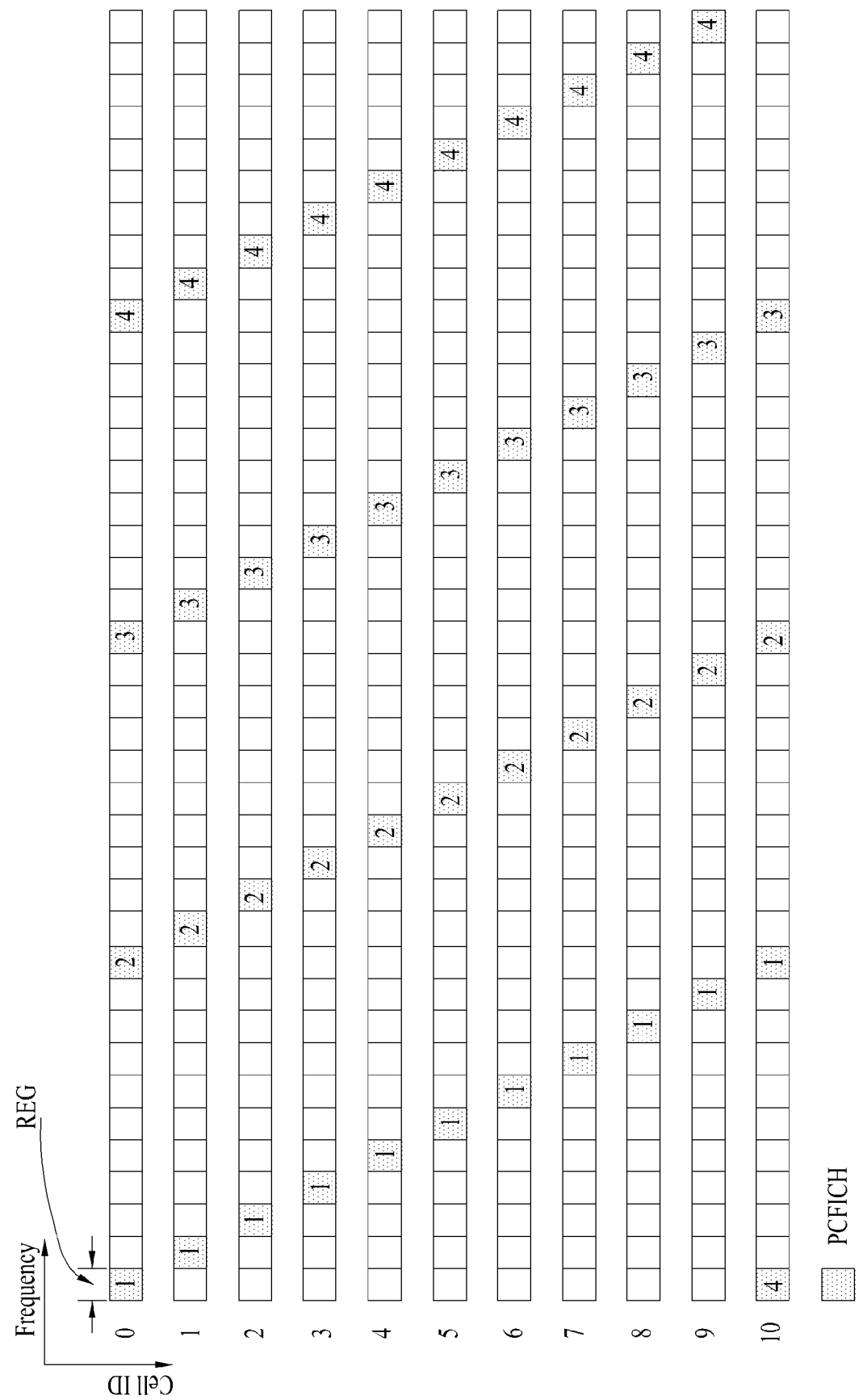
FIG. 11 is a diagram to illustrate a scheme for transmitting a physical control format indicator channel (PCFICH).

FIG. 11 is a diagram for a scheme for transmitting PCIFCH. REG shown in FIG. 11 is configured with 4 subcarriers, and more particularly, with data subcarriers except RS (reference signal). Generally, a transmit diversity scheme may apply thereto. A position of the REG may be frequency-shifted per cell (i.e., depending on a cell identifier) not to cause interference between cells. Additionally, PCFICH is always transmitted on a $1^{st}$ OFDM symbol (i.e., OFDM symbol index 0) of a subframe. Hence, when a receiving end receives a subframe, the receiving end acquires the number of OFDM symbols for carrying PDCCH by checking information of PCFICH and is then able to receive control information transmitted on the PDCCH.

PHICH (Physical Hybrid-ARQ Indicator Channel)

Figure 12:
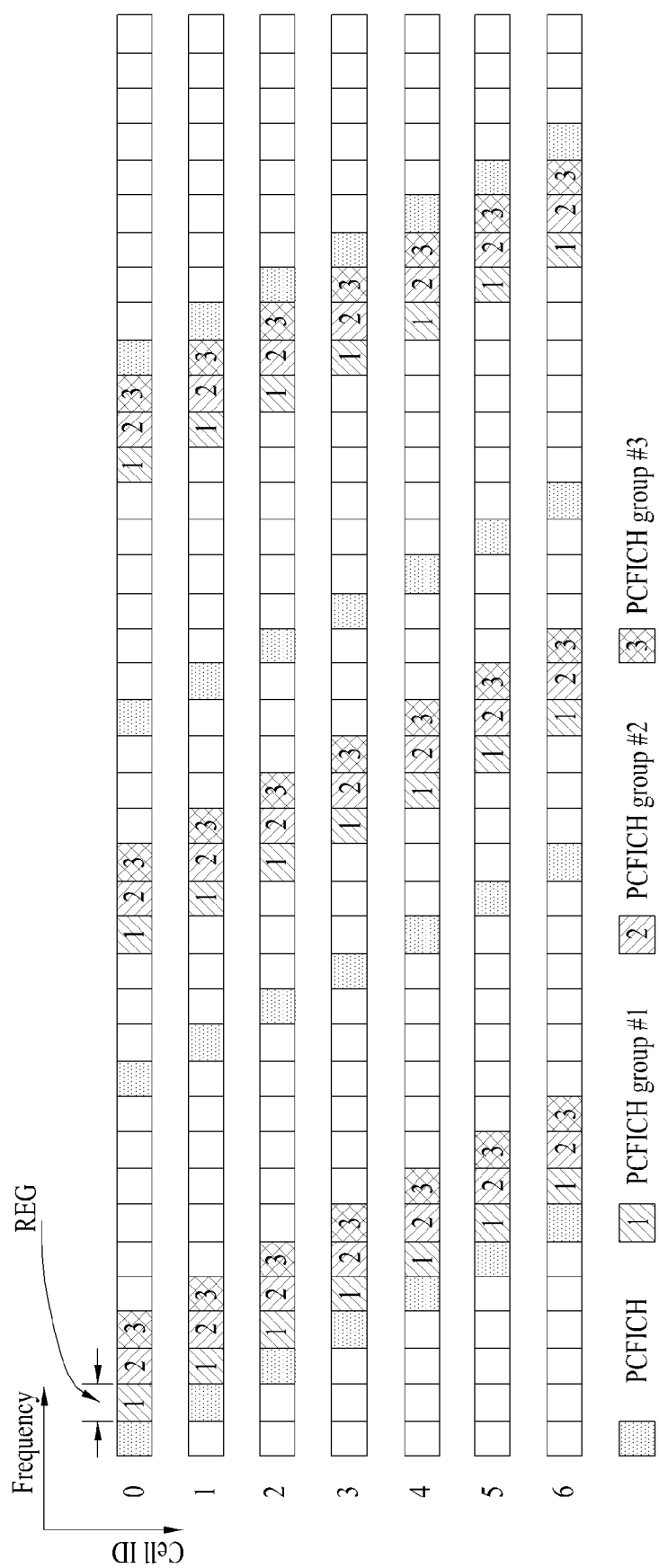
FIG. 12 is a diagram to illustrate positions of PCFICH and PHICH (physical HARQ indicator channel).

FIG. 12 is a diagram to illustrate positions of PCFICH and PHICH generally applied for a specific bandwidth. ACK/NACK information on an uplink data transmission is transmitted on PHICH. Several PHICH groups are created in a single subframe and several PHICHs exist in a single PHICH group. Hence, PHICH channels for several user equipments are included in the single PHICH group.

Referring to FIG. 12, PHICH assignment for each user equipment in several PHICH groups are performed using a lowest PRB (physical resource block) index of PUSCH resource allocation and a cyclic shift index for a demodulation reference signal (DMRS) transmitted on a UL (uplink) grant PDCCH. In this case, the DMRS is a UL reference signal and is the signal provided together with a UL transmission for channel estimation for demodulation of UL data. Moreover, PHICH resource is known through such an index pair as ($n_{PHICH}^{group}$, $n_{PHICH}^{seq}$). In ($n_{PHICH}^{group}$, $n_{PHICH}^{seq}$), $n_{PHICH}^{group}$ means a PHICH group number) and $n_{PHICH}^{seq}$ means an orthogonal sequence index in the corresponding PHICH group. Moreover, the number of PHICH groups is determined by a higher layer and can be derived from information on a size of PHICH resource, which is transmitted on a physical broadcast channel (PBCH).

Figure 13:
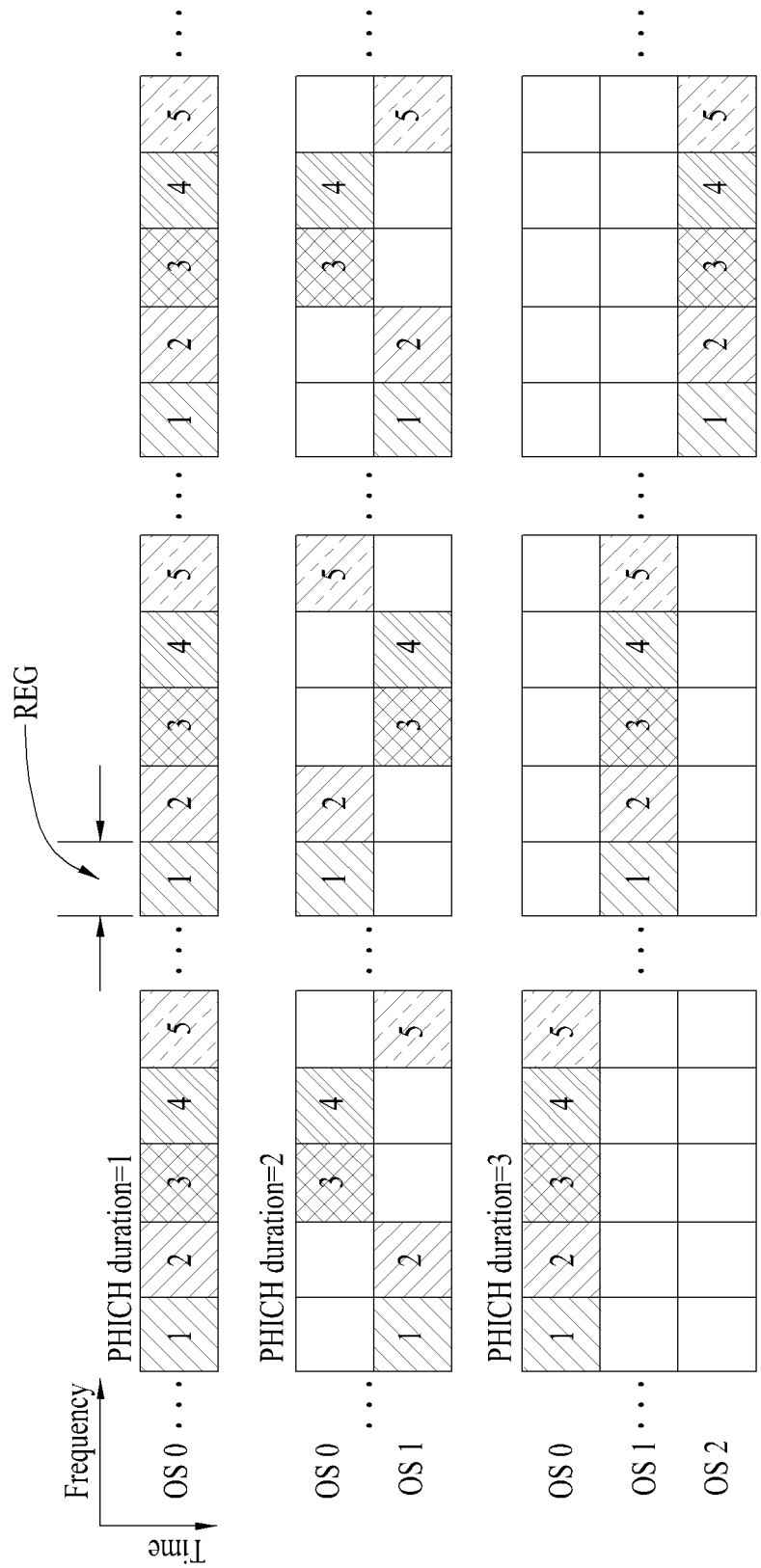
FIG. 13 is a diagram to illustrate a position of a downlink resource element to which a PHICH group is mapped.

FIG. 13 is a diagram to illustrate a position of a downlink resource element to which a PHICH group is mapped. Referring to FIG. 13, a PHICH group may be configured on a different time region (i.e., different OFDM symbol) in a single subframe depending on PHICH duration. In FIG. 13, if the PHICH duration is 1, PHICH is transmitted in OS0 (i.e., OFDM symbol index 0). If the PHICH duration is 2, PHICH is transmitted in OS1 (i.e., OFDM symbol index 1) and OS2 (i.e., OFDM symbol index 2). If the PHICH duration is 3, PHICH is transmitted in OS0 (i.e., OFDM symbol index 0) to OS2 (i.e., OFDM symbol index 2).

Protection of Control Channel & Data Channel

In an advanced wireless communication system (e.g., LTE-A system, LTE Release-10 system, etc.), a method of increasing a data rate and throughput on a cell-edge by performing inter-cell interference coordination (ICIC) in a manner of restricting a transmission of a specific cell from a specific resource or coordinating a beam direction of a specific cell is currently discussed.

Figure 14:
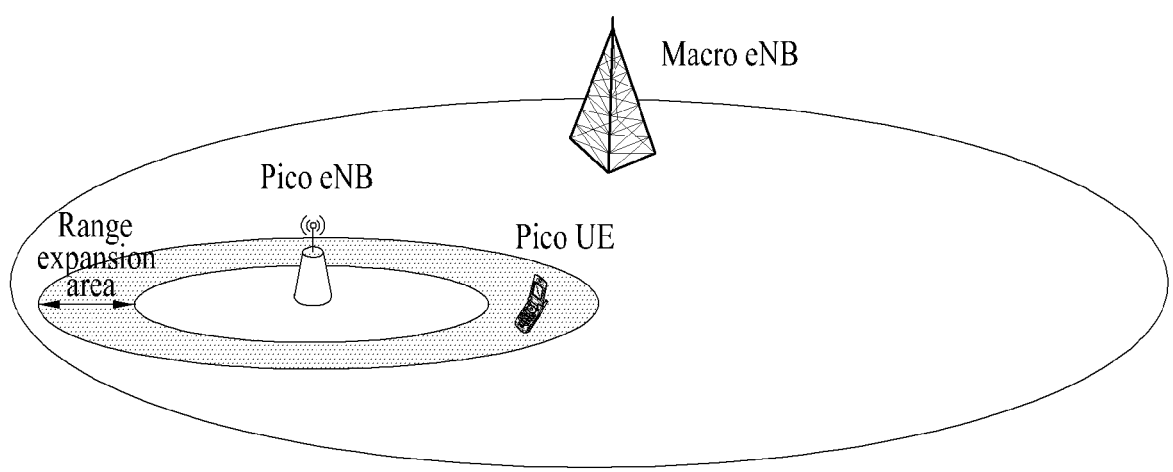
FIG. 14 is a diagram for one example of a heterogeneous network wireless communication system.

FIG. 14 is a diagram for one example of a heterogeneous network wireless communication system. The terminology named a heterogeneous network means a network having a macro base station and a micro base station coexist therein despite using the same RAT (radio access technology). The macro base station has a wide coverage and a high transmission power and means a general base station in a wireless communication system. The macro base station may be called a macro cell. Meanwhile, the micro base station may be called such a name as a micro cell, a pico cell, a femto cell, a home eNB (HeNB), a relay and the like. A pico base station (eNB) is exemplarily shown in FIG. 14. The micro base station is a small-scale version of the macro base station and can independently operate by performing most of the functions of the macro base station. And, the micro base station may include a base station of an overlay type that is installed within an area covered by the macro base station. Moreover, the micro base station may include a base station of a non-overlay type that can be installed in a radio shadow area not covered by the macro base station. The micro base station can accommodate a smaller number of user equipments with a coverage and transmission power smaller than those of the macro base station.

Micro base stations may be classified into two kinds of types depending on whether restriction is put on an access by a user equipment. A 1st type corresponds to a CSG (closed subscriber group) micro base station. And, a 2nd type corresponds to an OSC (open subscriber group) micro base station. The CSG micro base station can serve specific access-granted user equipments only, while the OSG micro base station can serve all user equipments with separate access restriction.

In case that a user equipment served by a macro base station is located close to a micro base station in the heterogeneous network shown in FIG. 14, interference may be caused to a DL signal, which is received from the macro base station by the user equipment, due to a strong DL signal from the micro base station. And, a user equipment served by the micro base station may receive storing interference caused by a DL signal from the macro base station.

FIG. 14 shows a case that cell range expansion (CRE) is applied in a pico cell. In this case, the CRE is a scheme for increasing overall system throughput by reducing a load put on a macro cell by forcing a range of the pico cell to expand. If a user equipment (i.e., Pico UE) served by the pico cell is located in a range expansion area of the pico cell, like the example shown in FIG. 14, the Pico UE may receive strong interference from a macro cell. In particular, performances of control and data channels received from the pico cell by the Pico UE may be considerably reduced. Thus, in case that one cell receives strong interference from an adjacent cell, inter-cell interference coordination (ICIC) for mitigating/eliminating the interference can be performed in a manner that the adjacent cell restricts its transmission from some resource regions (e.g., some subframes).

For one example, a method for an interfering cell (i.e., macro cell of the example shown in FIG. 14) not to perform a transmission in a specific resource region for a user equipment connected to an interfered cell (i.e., pico cell of the example shown in FIG. 14) [i.e., represented as a null signal transmission or a silencing] may be applicable. For example of a silencing operation, an aggressor cell can configure a specific subframe as an MBSFN subframe. In a DL subframe configured as an MBSFN subframe, a signal is transmitted in a control region only but is not transmitted in a data region. For another example of a silencing operation, an aggressor cell may configure a specific subframe as ABS (almost blank subframe) or ABS-with-MBSFN. In this case, the ABS means a subframe having CRS transmitted in control and data regions of a DL subframe only without transmitting control information and data. Yet, in the ABS, a DL channel (e.g., PBCH (physical broadcast channel), etc.) and a DL signal (e.g., PSS (primary synchronization signal), SSS (secondary synchronization signal, etc.) can be transmitted. The ABS-with-MBSFN means a case that CRS of a data region is not transmitted in the above-mentioned ABS.

In this case, the silencing performed specific resource region can be represented as a time resource and/or a frequency resource. For instance, a silenced time resource location may be determined by a combination of at least one of a whole time region, a specific subframe, a specific slot and a specific OFDM symbol unit. For instance, a silenced frequency resource location may be determined by a combination of at least one of a whole frequency band, a specific carrier (in case of carrier aggregation using a plurality of carriers), a specific resource block and a specific subcarrier unit. Therefore, a silencing performed resource region can be clearly specified up to a resource element (RE) unit.

Thus, if a transmission of an interfering cell on a specific resource is restricted, it can achieve the purpose of the ICIC to some extent. Yet, the strong interference from the interfering cell may still exist in the rest of the regions except the specific region. Therefore, applying ICIC through CoMP operation can be taken into consideration together with or separately from the above-described silencing scheme.

The CoMP operations may be mainly classified into JP (joint processing) and CS/CB (coordinated scheduling/coordinated beamforming). In this case, the CS/CB scheme is usable as a method of reducing inter-cell interference by coordination of cells within a CoMP cooperative set.

Figure 15:
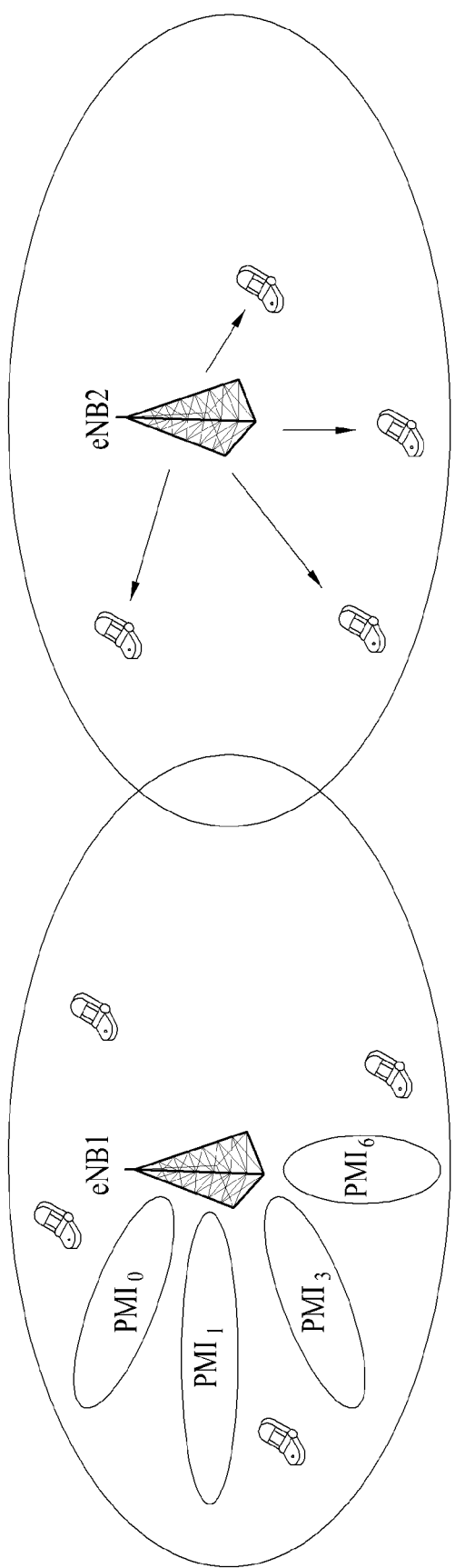
FIG. 15 is a diagram to describe one example of CoMP operation to which the present invention is applicable.

One example of the CB operation is described with reference to FIG. 15 as follows. First of all, if the CB scheme is used, inter-cell interference can be reduced or throughput can be raised by adjusting a beam direction of each cell through coordination of different cells. In the example shown in FIG. 15, assume that eNB1 and eNB2 indicate an interfering cell and an interfered cell, respectively. In order to reduce the interference given to the eNB2 by the eNB1, a beam direction of the eNB1 can be coordinated in a direction in which the eNB2 is not affected. The coordination of the beam direction can be performed by PMI restriction. In the example shown in FIG. 15, PMI0, PMI1, PMI3 and PMI6 are used but the rest of PMIs are not used. Hence, the eNB1 may not provide a service to a user equipment not located in the beam direction in case of using the PMI0, PMI1, PMI3 and PMI6. Instead, in aspect of the eNB2, as the beam direction of the eNB1 does not reach user equipments within a cell of the eNB2, the eNB2 can smoothly perform communications with its user equipments without interference from the eNB1.

In this case, in the current LTE/LTE-A system, the restriction put on the beam direction is applicable to a resource corresponding to a data channel only. And, it is impossible to apply the restriction on the beam direction to a resource corresponding to a control channel. For instance, in the processing of a DL data channel (PDSCH), a data transmission is defined to be performed on a good channel for a specific user equipment by adjusting a beam direction by a precoding processing. Yet, in case of a DL control channel (PDCCH), since a transmission should be performed in all directions to be received by all user equipments in a cell, a precoding is defined not to apply to a processing of the PDCCH. Hence, as mentioned in the above description, even if the CB scheme is applied, it is unable to coordinate a beam direction of a control channel of an interfering cell. For instance, subframe boundaries of two cells in a CoMP cooperative set match each other, since control channels of the two cells collide with each other, it is unable to secure control channel performance. If the subframe boundaries do not match each other, the control channel of one cell causes interference to the control channel and/or data channel of the other cell. Hence, it is unable to secure performance of the control/data channel.

Thus, the ICIC using the CB scheme may cause a serious problem to a heterogeneous network such as the macro-pico (i.e., a case that a transmission of the macro cell works as strong interference on the pico cell) shown in FIG. 14. For instance, if the beam direction coordination for the control channel of the macro cell is not performed, it may cause a problem that the system performance of the pico cell is considerably damaged.

Even if the various ICIC schemes (e.g., restriction put on a transmission of an interfering cell on a specific resource region, coordination of a beam direction of the interfering cell, etc.) mentioned in the foregoing description are applied, it may still happen that performance of the interfered cell is considerably damaged by the interference from the interfering cell. Therefore, the present invention proposes a method of solving such a problem.

In a general DL subframe structure of the related art, as shown in FIG. 3, several OFDM symbols in a first part of one subframe are defined as a control region used for a transmission of a control channel and the rest of OFDM symbols of the subframe are defined as a data region used for a transmission of a data channel. The present invention proposes to define a null region (i.e., OFDM symbol(s) carrying a null signal or no signals) between a control region and a data region of a DL subframe of a specific cell. In this case a space between a control region and a data region of a subframe may mean a space between a control channel and a data channel in a single subframe or a space between a control channel (or a data channel) of one subframe and a data channel (or a control channel) of another subframe contiguously next or previous to the former subframe. The specific cell may include an interfering cell or an interfered cell. Thus, if the above-described DL subframe is configured, the DL control channel and the DL data channel can be protected from the interference with another cell.

A DL subframe configuration including a null region proposed by the present invention can be implemented by a method for a specific cell to signal a start or end position of a data channel or a method for a specific cell to signal the number of OFDM symbols configuring the null region.

Among the control channels of the legacy LTE/LTE-A system, PCFICH is the channel that caries information (control channel format indication (CCFI)) on the number of OFDM symbols used for a transmission of PDCCH in one subframe. IN this case, the number of the OGDM symbols used for the PDCCH transmission may be set to 1, 2 or 3 for example. Hence, a user equipment can obtain the number of OFDM symbols used for a control channel transmission by decoding CFI (control format indicator) information transmitted on PCFICH. In the legacy LTE/LTE-A system, since a start position of a control channel is defined as a $1^{st}$ OFDM symbol (or OFDM symbol index 0) of a subframe, it is able to the CFI information to determine how many of first OFDM symbols of a single subframe are used for the control channel transmission. Thus, the user equipment can determine the start position and the end position of the control channel through the PCFICH. In the legacy LTE/LTE-A system, a start position of a data channel is implicitly determined as an OFDM symbol directly next to the end position of the control channel. In particular, without transmitting information on the start position of the data channel separately, it is able to determine the start position of the data channel indirectly depending on a result of the PCFICH decoding.

Yet, as proposed by the present invention, if a null region is inserted between a control channel and a data channel to protect the control and data channels, it is unable to exactly apply a method of analogizing a start position of the data channel from an end position of the control channel in the same manner of the related art. Therefore, it is necessary to define a new method for a user equipment to be aware of a start position (and/or an end position) of a data channel in a DL subframe.

Embodiment 1

The present embodiment relates to a case that a subframe of an interfering cell includes a null region.

FIG. 16 is a diagram to illustrate a subframe configuration according to one embodiment of the present invention. In the example shown in FIG. 16, assume that a macro cell is an interfering cell. And, assume that a pico cell is an interfered cell. Moreover, assume that a subframe boundary of the macro cell and a subframe boundary of the pico cell match each other. If the subframe boundaries match each other, it means that start and end points of a subframe of the macro cell are equal to start and end points of a subframe of the pico cell, respectively. Besides, in the example shown in FIG. 16, assume that a DL transmission frequency resource of the macro cell overlaps with a DL transmission frequency resource of the pico cell. This means that a DL transmission resource block of each of the macro cell and the pico cell exists on the same frequency band for example.

Referring to FIG. 16, a null region (or null symbols) may be included in a subframe of a macro cell. In this case, the null region can be situated between a control region for transmitting a control channel and a data region for transmitting a data channel. Thus, if the null region is inserted in the subframe of the macro cell, a control channel of a pico cell can be protected. In particular, a control region of the pico cell corresponding to the null region of the macro cell can avoid the interference from the macro cell.

In the example shown in FIG. 16, the number of control channel transmitting OFDM symbols of the macro cell is assumed as 1. Thus, as the case of decreasing the number of the control channel transmitting OFDM symbols of the macro cell, the following situation can be taken into consideration.

For instance, in case that a region of the pico cell expands, as shown in FIG. 14, the number of user equipments served by the pico cell increases but the number of user equipments served by the macro cell may decrease. In doing so, since a load put on the control channel supposed to be transmitted to the user equipments by the macro cell is reduced in response to the restricted number of the served user equipments, it is highly probable that the number of OFDM symbols (i.e., control region) necessary for the control channel transmission in a DL subframe can be decreased.

Moreover, although the present embodiment can be usefully used for a case of not applying the CB scheme, the present embodiment can be preferably used for a case that a macro cell coordinates inter-cell interference by restricting a beam direction. For instance, if the macro cell restricts a beam direction by PMI restriction or the like, the number of user equipments, which can be served by the macro cell, may become smaller than that of the case of not restricting the beam direction. Since a load put on a control channel supposed to be transmitted to the user equipments by the macro cell is reduced to correspond to the restricted number of the served user equipments, it is highly probable that the number of OFDM symbols (i.e., a control region) necessary for the control channel transmission in a DL subframe can be decreased.

Meanwhile, the control channel of the pico cell can be transmitted on 3 OFDM symbols. Even if the subframe of the macro cell includes the null region, a control channel of the $1^{st}$ OFDM symbol of the pico cell may receive string interference due to a control channel transmitted on a $1^{st}$ OFDM symbol (i.e., OFDM symbol index 0) of the macro cell. Since PCFICH for carrying CFI information is transmitted on the $1^{st}$ OFDM symbol of the pico cell, if a user equipment of the pico cell does not correctly perform PCFICH decoding due to the interference of the macro cell and is then unable to correctly obtain the number of OFDM symbols for a control channel transmission of the pico cell, the user equipment of the pico cell may not be able to decode the control channel correctly. Hence, even if the user equipment of the pico cell fails in performing the PCFICH decoding correctly, the following method may be available for a method for the user equipment of the pico cell to obtain the number of the OFDM symbols for the control channel transmission of the pico cell. First of all, a user equipment can indirectly analogize the number of OFDM symbols for a transmission of a control channel (PDCCH) from the number of OFDM symbols for a transmission of another control channel. For example, a user equipment is able to obtain the number of OFDM symbols for a control channel transmission implicitly through PHICH information. In particular, the user equipment can be informed of the number of PHICH transmitted OFDM symbols (or PHICH duration) through PBCH. If the PHICH is transmitted on 3 OFDM symbols, the user equipment can recognize that the control channel is transmitted on 3 OFDM symbols as well. Alternatively, the user equipment can be informed of the number of the OFDM symbols for the control channel transmission by higher layer signaling (e.g., RRC signaling). Alternatively, the number of the OFDM symbols for the control channel transmission can be defined to use a predetermined value without a separate signaling.

Meanwhile, a macro cell can reduce interference caused to a control channel of a pico cell in a manner of nullifying the rest of symbols (e.g., $2^{nd}$ OFDM symbol and $3^{rd}$ OFDM symbol) except a $1^{st}$ OFDM symbol, on which control information is transmitted by the macro cell, in a region for a pico cell to transit a control channel. Hence, the pico cell can configure and transmit a control channel to enable a user equipment served by the pico cell to correctly decode the control channel. For instance, the pico cell can apply a method of raising a CCE aggregation level of the control channel or the like.

In doing so, it is necessary for a base station of the macro cell to signal information such as a presence or non-presence of a null region, start and end points of the null region and the like to the scheduled user equipments within the cell. This shall be explained in detail later in the description of Embodiment 4.

Embodiment 2

The present embodiment relates to a case that a subframe of an interfered cell includes a null region.

Figure 17:
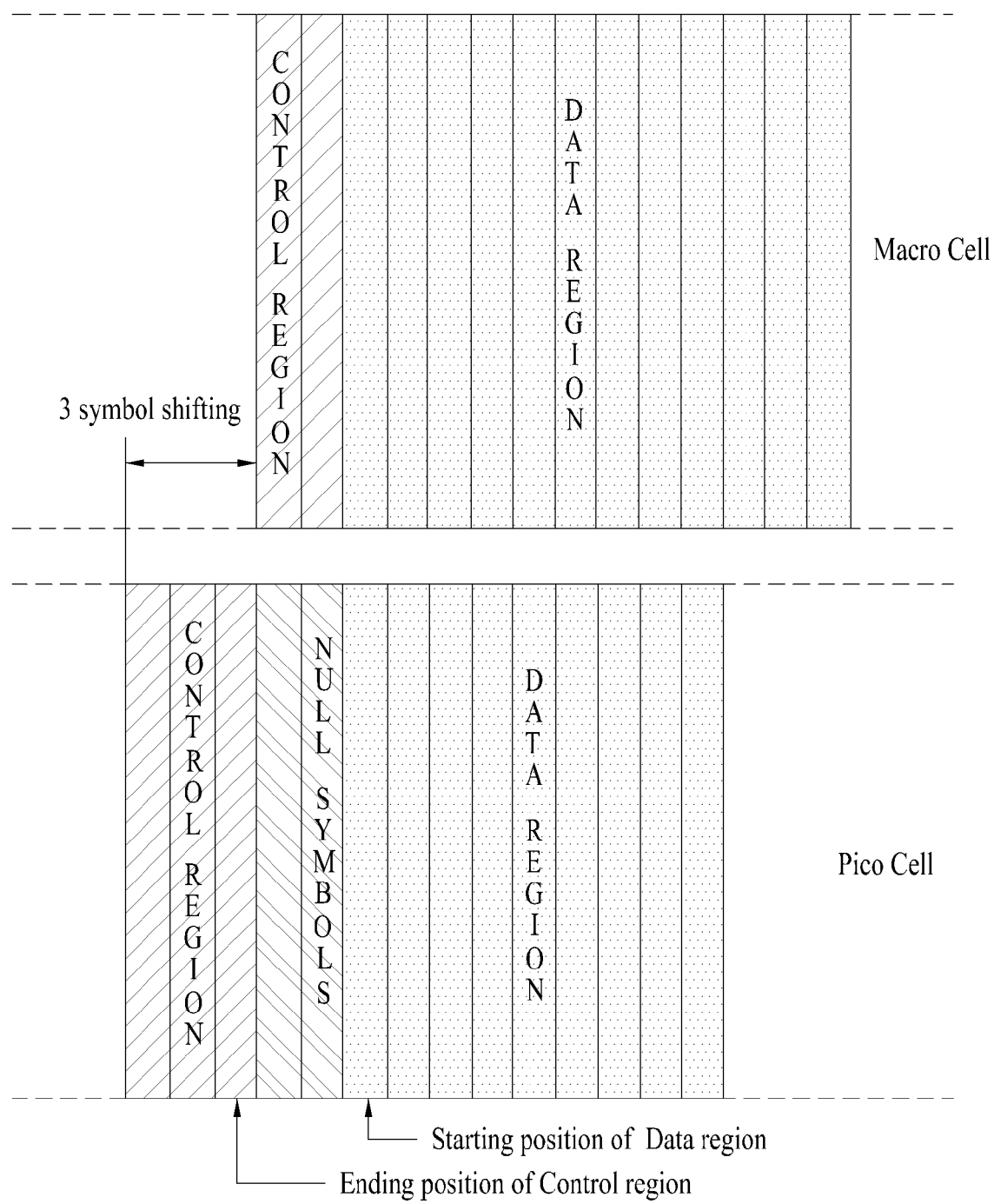

FIG. 17 is a diagram to illustrate a subframe configuration according to one embodiment of the present invention. In the example shown in FIG. 17, assume that a macro cell is an interfering cell. And, assume that a pico cell is an interfered cell. Moreover, unlike FIG. 16, FIG. 17 assumes that a subframe boundary of the macro cell and a subframe boundary of the pico cell do not match each other. In this case, the subframe boundary of the macro cell can be shifted in comparison with the subframe boundary of the pico cell [e.g., shifted behind on a time axis]. In the example shown in FIG. 17, the subframe boundary of the macro cell is shifted by a control region size (e.g., 3 OFDM symbols) of the pico cell. Besides, in the example shown in FIG. 17, assume that a DL transmission frequency resource of the macro cell overlaps with a DL transmission frequency resource of the pico cell. This means that a DL transmission resource block of each of the macro cell and the pico cell exists on the same frequency band for example.

If the boundaries of the two cells do not match each other, as shown in FIG. 17, it may be the result from the inter-cell interference coordination for shifting the subframe boundary of the macro cell by the control channel region (e.g., 3 OFDM symbols) of the pico cell to protect a control channel of the pico cell.

In this case, it is able to assume a case that a data region of the macro cell except a control region shown in FIG. 17 is silenced. If so, a control channel transmission of the macro cell may cause interference to a prescribed region of the data channel of the pico cell, whereas the control channel of the pico cell is free from the interference from the macro cell. In this case, in order to secure performance of the data channel of the pico cell, OFDM symbols, which overlap with the control region of the macro cell, in the subframe of the pico cell can be determined as a null region.

When the CB scheme is applied together with or separately from the silencing scheme, if the macro cell coordinates a beam direction, the data channel of the macro cell may have a beam not formed in direction of the pico cell. In this case, although the control channel of the pico cell overlaps with the data channel of the macro cell in aspect of the pico cell [e.g., a data region (not shown in the drawing) of a subframe previous to the subframe of the macro cell shown in FIG. 17], since the beam direction of the data channel of the macro cell is restricted, an interference level working on the control channel of the pico cell can be considerably lowered. Yet, since the beam direction restriction is not put on the control channel of the macro cell, a part, which overlaps with the control channel of the macro cell, of the data channel of the pico cell may receive strong interference from the macro cell. In this case, in order to secure performance of the data channel of the pico cell, OFDM symbols, which overlap with the control region of the macro cell, in the subframe of the pico cell can be determined as a null region.

Figure 18:
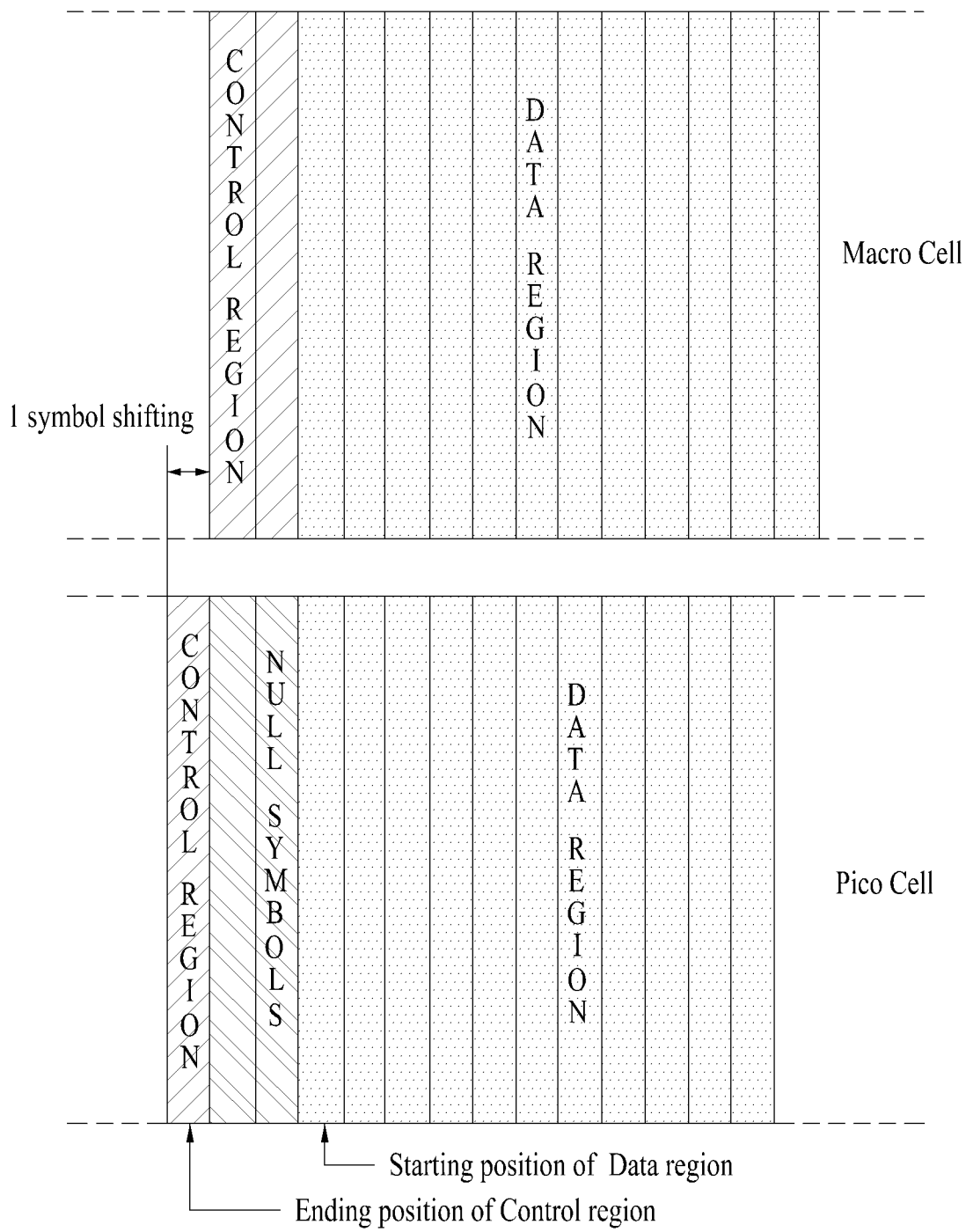

In addition, for another example of inserting a null region in a subframe of a pico cell and shifting a subframe boundary of the pico cell, it is able to assume a case that a control region of the pico cell is restricted to 1 OFDM symbol or 2 OFDM symbols. FIG. 18 shows one example that a control region of the pico cell is restricted to 1 OFDM symbol. In this case, a control region of a macro cell can be configured depending on a value (e.g., 2 OFDM symbols) resulting from excluding a size (e.g., 1 OFDM symbol) of the control region of the pico cell from a maximum value (e.g., 3 OFDM symbols) that can be occupied by the corresponding control region. And, as a subframe boundary of the macro cell is shifted by the size (i.e., 1 OFDM symbol) of the control region of the pico cell, the control region of the pico cell can be protected. Moreover, the pico cell can configure OFDM symbols next to the control region of the pico cell, which overlaps with the control region of the macro cell, as a null region.

In this case, it may be necessary for a base station of the pico cell to signal information such as a presence or non-presence of the null region, start and end points of the null region and the like to user equipments scheduled within the corresponding cell. This shall be described in detail with reference to Embodiment 4 later.

Embodiment 3

The present embodiment relates to a case that a subframe of an interfered cell includes a null region.

Figure 19:
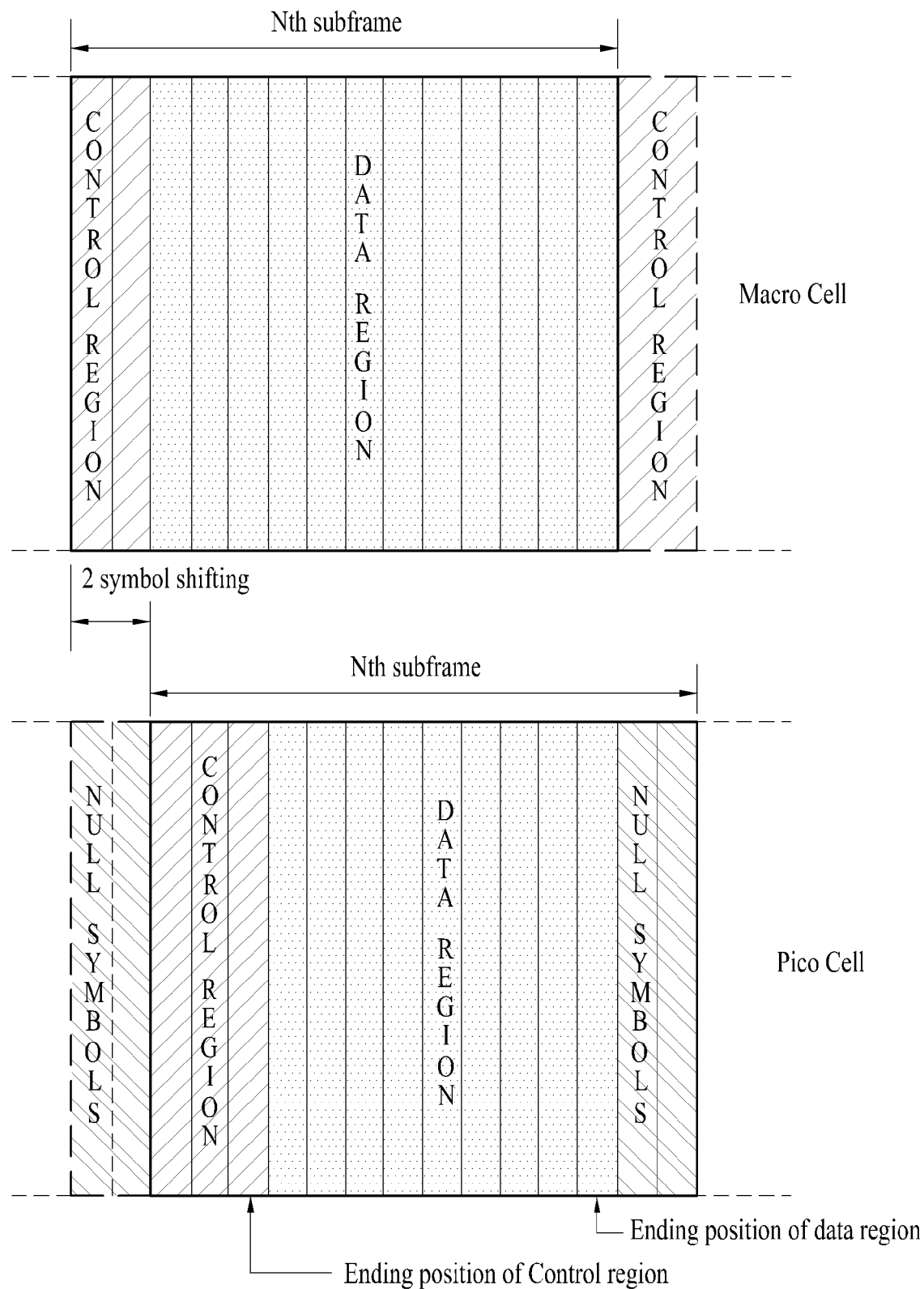

FIG. 19 is a diagram to illustrate a subframe configuration according to one embodiment of the present invention. In the example shown in FIG. 19, assume that a macro cell is an interfering cell. And, assume that a pico cell is an interfered cell. Moreover, FIG. 19 shows a case that a subframe boundary of the macro cell and a subframe boundary of the pico cell do not match each other. Besides, in the example shown in FIG. 19, assume that a DL transmission frequency resource of the macro cell overlaps with a DL transmission frequency resource of the pico cell. This means that a DL transmission resource block of each of the macro cell and the pico cell exists on the same frequency band for example.

Unlike the former example shown in FIG. 17 or FIG. 18, FIG. 19 shows a case that the subframe boundary of the macro cell is shifted [e.g., shifted ahead on a time axis]. In this case, a null region is located at a last part of $N^{th}$ subframe of the pico cell to protect a data channel of the pico cell [i.e., the null region can be configured in a region overlapping with a control channel of (N+1)$^{th}$ subframe of the macro cell]. If so, it may be necessary to inform a user equipment of an end position of the data channel (or a start position of the null region).

According to the various examples of the present invention mentioned in the descriptions of the embodiments 1 to 3, a null region can be configured in a prescribed interval of a subframe of an interfering cell or an interference-given cell. The null region configured in the subframe of the interfering cell (or the interference-given cell) may correspond to a control region of the interference-given cell (or the interfering cell) entirely or in part. Thus, it is necessary for a cell, which configures a null region, to inform user equipments served by the corresponding cell of such an information as a presence or non-presence of the null region, start and end points of the null region and the like.

Embodiment 4

In a related art system, PCFICH can be used to inform a user equipment of information indicating the number (i.e., an end position of a PDCCH transmission) of OFDM symbols used for a transmission of a control channel (PDCCH). And, the user equipment can implicitly recognize that an OFDM symbol right next to the PDCCH end position is a start position of a data channel (PDSCH) transmission. Yet, in case that a null region is included, an OFDM symbol right next to an end position of a control channel may not be always a start position of a data channel or an end position of the data channel may not be always a last OFDM symbol of a subframe. Hence, it is necessary for a user equipment to be informed of information on a position of the null region.

To this end, a base station can signal an end position of a control channel and/or a start position (or an end position) of a data channel to a user equipment, of which details are described as follows.

First of all, in a current LTE/LTE-A system, regarding various situations (e.g., a case of a user equipment having on carrier configured in surplus, a case of a user equipment having a single carrier configured, a case of a relay node, etc.), the user equipment (or the relay node) may receive a signaling of an end position of PDCCH or a signaling of a start position of PDSCH.

In case that a user equipment receives a signaling of an end position of PDCCH from a base station, in order to apply a null region of the present invention, the user equipment can additionally receive a signaling of a start position (or an end position) of PDSCH or a signaling of an information on a position of the null region in addition.

In this case, if the end position of the PDCCH signaled to the user equipment from the base station simultaneously means the start position of the PDSCH (i.e., an OFDM symbol right next to the end position of the PDCCH means the start position of the PDSCH like the CFI information of the related art), the user equipment can additionally receive a signaling of the position of the null region from the base station in order to apply the present invention. For instance, a signaled value for the PDCCH end position is used as an actual PDCCH end position. And, an actual start position of the PDSCH may be determined as an OFDM symbol corresponding to a value resulting from adding a length of the null region to the PDSCH start position indicated as an OFDM symbol right next to the end position of the PDCCH (e.g., in case of the macro cell shown in FIG. 16 or the pico cell shown in FIG. 17). For another instance, if the end position (or the number of PDCCH transmission OFDM symbols) of the PDCCH is signaled as a maximum value, the OFDM symbol number corresponding to a value resulting from subtracting the length of the null region from the maximum value is determined as an actual PDCCH transmission OFDM symbol number. And, an actual start position of the PDSCH can be determined as an OFDM symbol right next to the PDCCH end position of the maximum value [e.g., in case of the pico cell shown in FIG. 18].

Alternatively, if the end position of the PDCCH signaled to the user equipment from the base station simultaneously means the start position of the PDSCH, the user equipment can additionally receive a signaling of the end position of the PDSCH from the base station in order to apply the present invention. In this case, the end position of the PDCCH becomes an actual end position of the PDCCH, the start position of the PDSCH becomes an OFDM symbol right next to the actual end position of the PDCCH, and the end position of the PDSCH can be determined depending on a signaled value [e.g., in case of the pico cell shown in FIG. 19].

In case that a user equipment receives a signaling of a start position of PDCCH from a base station, in order to apply a null region of the present invention, the user equipment can additionally receive a signaling of an end position of PDCCH or a signaling of an information on a position of the null region in addition. Hence, the user equipment can determine a PDCCH transmission region, a null region and a PDSCH transmission region. Meanwhile, in case that a null region is located on a last part of a subframe, as shown in FIG. 19, a position of the null region can be determined by receiving a signaling of an end position of PDSCH.

In the above description, a user equipment is able to basically obtain an end position of a control channel through PCFICH decoding (e.g., PDCCH). Yet, if the PCFICH decoding is difficult due to strong interference and the like, it is able to apply a scheme for indirectly obtaining the number of control channel transmission OFDM symbols from PHICH information transmitted on PBCH or a scheme for obtaining the number of control channel transmission OFDM symbols using a higher layer signaling or a predefined value. According to the present invention, after the number of control channel transmission OFDM symbols has been determined using the above-mentioned various schemes, a user equipment obtains additional information on a PDSCH transmission region through PDCCH decoding based on the determined number of control channel transmission OFDM symbols and then performs PDSCH decoding.

Moreover, at least one of a start or end position of a data channel (PDSCH), an end position of a control channel (PDCCH) and a position of a null region is provided to a user equipment through a higher layer signaling (e.g., an RRC signaling) or via another channel (e.g., a broadcast channel, etc.), or a predetermined value may be usable.

In case that other information can be analogized from some of the above-mentioned informations including the information on control channel, the information on data channel and the information on null region, it is possible not to forward the analogical information. If so, the overhead of the control information forwarding can be reduced and network performance can be improved. For instance, if a start position of a data channel can be analogized from information on an end position of a control channel and information on a length of a null region, information on the data channel may not be forwarded. For another instance, if an end position of a control channel can be analogized from information on a start position of a data channel and information on a length of a null region, information on the control channel may not be forwarded.

Embodiment 5

If various embodiments of the present invention for applying a null region to a DL subframe are applied, it may be necessary for base stations (e.g., a macro cell and a pico cell, etc.) interfering with each other to exchange informations for inter-cell interference coordination with each other. These informations can be exchanged through a backhaul link (or X2 interface) between the base stations, of which detailed examples are described as follows.

First of all, one base station can inform other base station(s) of control channel related information. In particular, the number of OFDM symbols for transmitting a control channel thereon (or CFI value), a start position (or an end position) of the control channel and the like can be signaled. And, information on a subframe having a control region blanked only (i.e., a subframe having a data region carry information only with a blanked or nullified control region) may be signaled [This may be named a control only blank subframe and its details shall be explained in the description of Embodiment 7 later].

One base station is able to inform other base station(s) of data channel related information. In particular, a start position (or an end position) of a data channel and the like can be signaled.

One base station is able to inform other base station(s) of null region related information. In particular, a start position (or an end position) of a null region, the number of OFDM symbols occupied by the null region (or a length of the null region) and the like can be signaled.

The above-mentioned informations including the information on control channel, the information on data channel and the information on null region may be forwarded to another base station independently or in a combination form of at least two of the informations. In case that other information can be analogized from some of the above-mentioned informations, it is possible not to forward the analogical information. If so, the overhead of the control information forwarding can be reduced and network performance can be improved. For instance, if a start position of a data channel can be analogized from information on an end position of a control channel and information on a length of a null region, information on the data channel may not be forwarded. For another instance, if an end position of a control channel can be analogized from information on a start position of a data channel and information on a length of a null region, information on the control channel may not be forwarded.

Embodiment 6

In case that a control channel of an interfered cell (e.g., the pico cell shown in FIG. 14) receives strong interference by a control channel of an interfering cell (e.g., the macro cell shown in FIG. 14), performance of an interfered cell is considerably lowered. Therefore, the present embodiment proposes a method of transmitting a control channel (e.g., PDCCH) of an interfered cell by avoiding a control region (e.g., a PDCCH transmission region) of an interfering cell. To help the understanding of various examples mentioned in the following description, it is able to assume a case that the PDCCH of the interfering cell causes strong interference at the $1^{st}$ OFDM symbol (OFDM symbol index 0) of the DL subframe in the example shown in FIG. 16, by which the scope of the present invention may be non-limited. Namely, the following examples can be applied as a method of minimizing the interference influence in a manner of maximally decreasing the number of resource elements (REs) used for a PDCCH transmission on a specific OFDM symbol, which receives storing interference, among PDCCH transmission OFDM symbols of a DL subframe of an interfered cell.

Embodiment 6-1

The present embodiment relates to a method of applying a control channel element (CCE) nulling in an interfering cell. In this case, PDCCH is transmitted in a combination form of at least one contiguous CCE, one CCE corresponds to a plurality of resource element groups (REGs), and one REG includes a plurality of resource elements (REs).

According to the present embodiment, it is able to nullify CCE including REG belonging to an OFDM symbol, which is aligned with (overlapping on a time axis with) an OFDM symbol carrying PDCCH of an interfering cell, of a subframe of an interfered cell. In this case, the nullification (or nulling) can be understood as the meaning similar to that of a rate matching. And, nullifying the CCE can be represented as mapping PDCCH to REs except the RE corresponding to the CCE.

In this case, each CCE is interleaved by REG unit before being mapped onto a physical resource. Hence, the REG belonging to the OFDM symbol, which overlaps with the PDCCH transmission OFDM symbol of the interfering cell, of the interfered cell can correspond to a plurality of CCEs. And, the nullified CCE may include a plurality of CCEs. In this aspect, the present embodiment for nullifying the CCE can operate more efficiently in the case of a wider system bandwidth rather than the case of a narrower system bandwidth. This is because an amount of resources available for a control channel transmission may decrease in accordance with the increasing number of the nullified CCEs depending on an increasing system bandwidth.

Embodiment 6-2

The present embodiment relates to a method of signaling a maximum value of a PHICH group to a user equipment from an interfered cell. In particular, a base station can inform the user equipment that the number of PHICH groups has a maximum value irrespective of the number of actually used PHICH groups. Moreover, although the number of the PHICH groups is signaled as the maximum value, it is able to put restriction on an actual PHICH to be transmitted on a $1^{st}$ OFDM symbol of a DL subframe only. Since PHICH is intensively mapped to the $1^{st}$ OFDM symbol only, less PDCCH can be mapped to the $1^{st}$ OFDM symbol.

The above-mentioned method of signaling the maximum value of the PHICH group can be used together with the aforementioned embodiment 6-1. In particular, the present embodiment 6-2 can be also used as a method of reducing an amount of PDCCH assigned resources in a specific OFDM symbol (e.g., the $1^{st}$ OFDM symbol in the example shown in FIG. 16) expected to experience strongest interference caused by PDCCH of the interfering cell.

Embodiment 6-3

The present embodiment relates to a method of signaling a PDCCH mapping start position (i.e., OFDM symbol) to a user equipment from an interfered cell. A PDCCH start OFDM symbol position can be signaled to the user equipment separately from such information as CFI and the like. In this case, a PDCCH end symbol position may be separately signaled or may be indicated through CFI of the related art. For instance, if it is signaled that a PDCCH start OFDM symbol is a $2^{nd}$ OFDM symbol (i.e., OFDM symbol index 1), it is able to configure that PCFICH and PHICH are transmitted on a $1^{st}$ OFDM symbol (i.e., OFDM symbol index 0) without a transmission of PDCCH.

If the present embodiment is extended, it can be used as a method of indicating a start position of a specific PDCCH when an interfered cell maps the specific PDCCH to a symbol not overlapping with a PDCCH transmitted region of an interfering cell.

Embodiment 6-4

The present embodiment relates to a method for using REG (or RE) puncturing in an interfered cell. In particular, a receiving end (e.g., a user equipment) punctures RES (or RE) belonging to a strongly-interfering OFDM symbol of an interfering cell or an OFDM symbol overlapping with a PDCCH transmission region of the interfering cell and is then able to decode PDCCH. The decoding by puncturing a specific REG (or RE) means that a receiving end attempts a decoding by excluding the corresponding REG (or RE) despite that a transmitting end transmits information carried on the corresponding REG (or RE). For instance, when a decoding is performed, it is able to use a method of forcing a power received at a corresponding REG (or RE) to be set to 0. Moreover, when a transmitting end maps PDCCH to REG, it is able to puncture a specific REG (or RE). The REG puncturing performed by the transmitting end may differ from the nulling of mapping PDCCH by excluding a specific PRE (or RE) in that the specific REG (or RE) is not transmitted (or that a transmission power is set to 0) after mapping the PDCCH to the REG (or RE).

When a receiving end uses REG (or RE) puncturing for PDCCH decoding, a transmitting end has advantage in using every CCE free from restriction without considering a presence or non-presence of interference. Yet, if a specific REG (or RE) is punctured, an amount of information available for PDCCH decoding in the receiving end is reduced. Hence, PDCCH decoding performance may be lowered.

The REG (or RE) supposed to be punctured can be indicated in a manner that an interfered cell signals information on a transmission region (e.g., a start position of a control channel, an end position of a control channel, the number of transmission OFDM symbols, etc.) of a control channel of an interfering cell to a user equipment of the interfered cell. Alternatively, after a user equipment directly measures interference on a DL resource, if the interference of an interfering cell is greater than a prescribed threshold, it is able to use a method of performing decoding by puncturing REG (or RE) belonging to a corresponding resource (or a corresponding OFDM symbol).

Embodiment 6-5

The present embodiment relates to a method of using REG (or RE) nulling in an interfered cell. In particular, after an interfered cell has nullified a strongly-interfering REG (or RE) of an interfering cell, it is able to perform REG (or RE) configuration for control channels. Hence, any information is not transmitted on the nullified REG (or RE) and a receiving end (e.g., a user equipment) is able to perform decoding by considering that no information exists in the nullified REG (or RE). In such point, the nulling can differ from the puncturing performed in a manner of excluding a specific REG (or RE) despite information is carried on the corresponding REG (or RE).

A base station of an interfered cell is able to signal information (e.g., information on a position on time/frequency, etc.) on a nullified REG (or RE) to a user equipment using a higher layer signaling. For instance, the base station can provide the user equipment with a bitmap indicating what the nulling REG (or RE) is by RRC signaling.

In case that strong interference is caused to a specific REG (or RE), the nulling of REG (or (RE) may be used as a method of minimizing influence of interference in a manner of excluding the corresponding REG (or RE) from REGs (or REs) to be used for a PDCCH transmission in a transmitting end.

The methods proposed by the aforementioned embodiments 6-1 to 6-5 can be independently applicable or may be usable as a method of specifying a resource to use for a PDCCH transmission of an interfered cell and signaling a position of the corresponding resource to a user equipment in a manner of being combined with each other.

Embodiment 7

The present embodiment relates to a method of not performing a transmission on a control region in a specific subframe of an interfering cell. In other words, according to the present embodiment, a null region of a specific subframe includes a whole control region of the corresponding subframe.

FIG. 20 is a diagram to describe an inter-cell interference coordination according to one embodiment of the present invention. FIG. 20 shows one example of application of CB scheme. In FIG. 20, eNB1 is assumed as an interfering cell and eNB2 is assumed as an interfered cell. The eNB1 can coordinate a beam direction toward a different direction for each PMI set. The eNB1 is able to inform the eNB2 of an available subframe set by signaling through X2 interface. The available subframe set may correspond to subframes in which the eNB2 has uniform (or identical) interference specification from the eNB1. And, the signaling of the available subframe set can be configured in a bitmap format indicating the corresponding subframe. Having received the information on the available subframe set from the eNB1, the eNB2 is able to perform a signaling on user equipments within its cell to perform measurements. In this case, a subframe, on which the user equipment is going to perform the measurement, can be configured as some or whole subframes of the available subframe set received from the eNB1.

Referring to FIG. 20, the 2NB2 can signal a request for coordination of transmission power of the eNB 1, PMI set use coordination or the like to the eNB1. This request signaling may be configured with information, which indicates that the eNB1 is to lower a transmission power in a specific subframe or that the eNB2 will use a specific PMI set, requested to the eNB1 by the eNB2. And, such signaling may be performed via X2 interface. Accordingly, the eNB1 is able to apply a specific beam pattern (i.e., a use of the specific PMI set) in a specific subframe in consideration of the request information of the eNB2. Moreover, the eNB1 can provide the corresponding information to user equipments within its cell. In particular, the eNB1 can send a signaling to the user equipment to select PMI from the specific PMI set only (i.e., PMI restriction) or may schedule a subframe, which is determined in consideration of the request information of the eNB2, for the user equipment that uses the corresponding PMI. As mentioned in the foregoing description, such an operation as a beam direction coordination in cells exchanging interference with each other, an exchange of an available subframe set between cells exchanging interference with each other and the like can be applied to various examples of the present invention as well as to the example shown in FIG. 20.

Thus, in case that an interfering cell coordinates a beam direction by applying a CB scheme, CB is effectively applicable to a signal transmitted in a data region only. Yet, it is unable to put restriction on a beam pattern for a signal transmitted in a control region. Hence, even if the eNB1 coordinates the beam pattern, a signal of a control region of the eNB1 can still work as strong interference on the eNB2.

In order to reduce interference caused by a signal in a control region of an interfering cell, the present embodiment proposes a method for an interfering cell not to perform a transmission in a control region of a specific subframe. In a DL subframe, $1^{st}$ 1-, 2- or 3-OFDM symbol duration can be configured as a control region and the rest of duration can be configured as a data region (at the absence of a null region) [cf. FIG. 3]. In this case, the meaning of 'not to perform a transmission in a control region' may indicate that a control channel such as PCFICH, PHICH, PDCCH and the like is not mapped to the control region and can be presented as blanking or nullifying the control region. In this case, a reference signal (RS) may be transmitted in the control region, while a control signal (or a control channel) of the control region is not transmitted.

In this case, a set of control region blanked/nullified subframes can be configured with a subset of an available subframe set signaled to the eNB2 by the eNB1. In the example shown in FIG. 20, it is able to assume that the eNB2 experiences uniform (or equal) interference of the eNB1 in the available subframe set signaled via the X2 interface. For instance, the eNB2 may construe that the eNB1 limitedly uses a specific PMI set of the available subframe set only. In this case, the available subframe set corresponds to each PMI set used by the eNB1 and the eNB1 may signal a plurality of subframe sets to the eNB2.

Thus, if an interfering cell does not perform a transmission in a control region of a specific subframe, it is unable to transmit PDCCH by the related art definition (i.e., transmitted in a control region of a DL subframe). Moreover, in order for a user equipment to correctly receive/decode a data channel transmitted in the corresponding subframe, a control channel (particularly, PDCCH) configured to carry control information on a transmission of the data channel needs to be transmitted to the user equipment. Therefore, the present invention proposes a method of transmitting control information (or a control channel) to a user equipment despite an absence of a transmission of a control region in a specific subframe.

For one example, a transmission of a control region is not performed in a specific subframe to reduce interference in an interfering cell but control information necessary for a data transmission of the specific subframe can be previously transmitted in another subframe. In particular, in the example shown in FIG. 20, in order to reduce the interference caused by the control region of the eNB1, the eNB1 may not perform a transmission in the control region of available subframe set signaled to the eNB2 via the X2 interface. The control region, in which the control region transmission is not performed, may correspond to the subframe denoted by 1 in the bitmap indicating the available subframe set and may also correspond to a subframe on which the eNB1 puts beam direction restriction, for example. In this case, the control information on the data region transmission in the subframe denoted by 1 in the bitmap can be transmitted in another subframe (e.g., a subframe denoted by 0 in the bitmap). And, the control information on the data transmission in the subframe having no control region transmission can be transmitted in a control region transmission performed subframe among subframes ahead of the corresponding subframe. Moreover, in one subframe in which a control region transmission performed, control information on a data transmission in at least one another subframe, in which the control region transmission is not performed, can be transmitted.

For another example, a transmission of a control region is not performed in a specific subframe to reduce interference in an interfering cell but control information necessary for a data transmission of the specific subframe can be transmitted in a data region of the specific subframe together with data. In particular, OFDM symbols of the control region of the specific subframe are nullified (e.g., a reference signal (RS) of the control region can be transmitted) and control information can be precoded and transmitted in the data region of the specific subframe together with the data. Therefore, the transmission of the control information is enabled in a specific beam direction, whereby interference caused by the control information can be reduced. Thus, a control channel transmitted in a data region of a DL subframe can be newly defined, which may be named an evolved-PDCCH (E-PDCCH) to be distinguished from a DL control channel (PDCCH) of the related art. Moreover, it may be able to use R-PDCCH (i.e., a channel configured to carry scheduling information on a PDSCH transmission to a relay node by being transmitted in a data region) proposed as a control channel for the relay node. In the example shown I FIG. 20, the E-PDCCH can be transmitted in a data region of one of subframes (i.e., the subframes in which a control region transmission is not performed) denoted by 1 in the bitmap of the available subframe set transmitted to the eNB2 by the eNB1 via the X2 interface. And, control information on data transmission in another one subframe denoted by 1 in the bitmap or a plurality of subsequent subframes can be transmitted on the E-PDCCH.

The matters explained in the description of the present embodiment may be explained in viewpoint that a null region of a specific subframe includes a whole control region of the corresponding subframe. For instance, it is able to assume a case that subframe boundaries of interference-exchanging cells match each other and a case that lengths of the control regions thereof are equal to each other. In this case, if a null region is applied to a whole control region of a DL subframe of an interfering cell, interference with a neighboring cell can be reduced and control information of a data transmission of the interfering cell can be transmitted using a control channel (e.g., E-PDCCH) of a new type transmitted in a data region. Alternatively, when a transmission of a control region is performed in a DL subframe of an interfering cell and a whole control region of an interfered cell receives strong interference due to the control region transmission, if a null region is applied to the whole control region of the corresponding DL subframe of the interfered cell, influence of the interference can be reduced and control information for a data transmission of the interfered cell can be transmitted using a control channel (e.g., E-PDCCH) of a new type transmitted in a data region.

Figure 21:
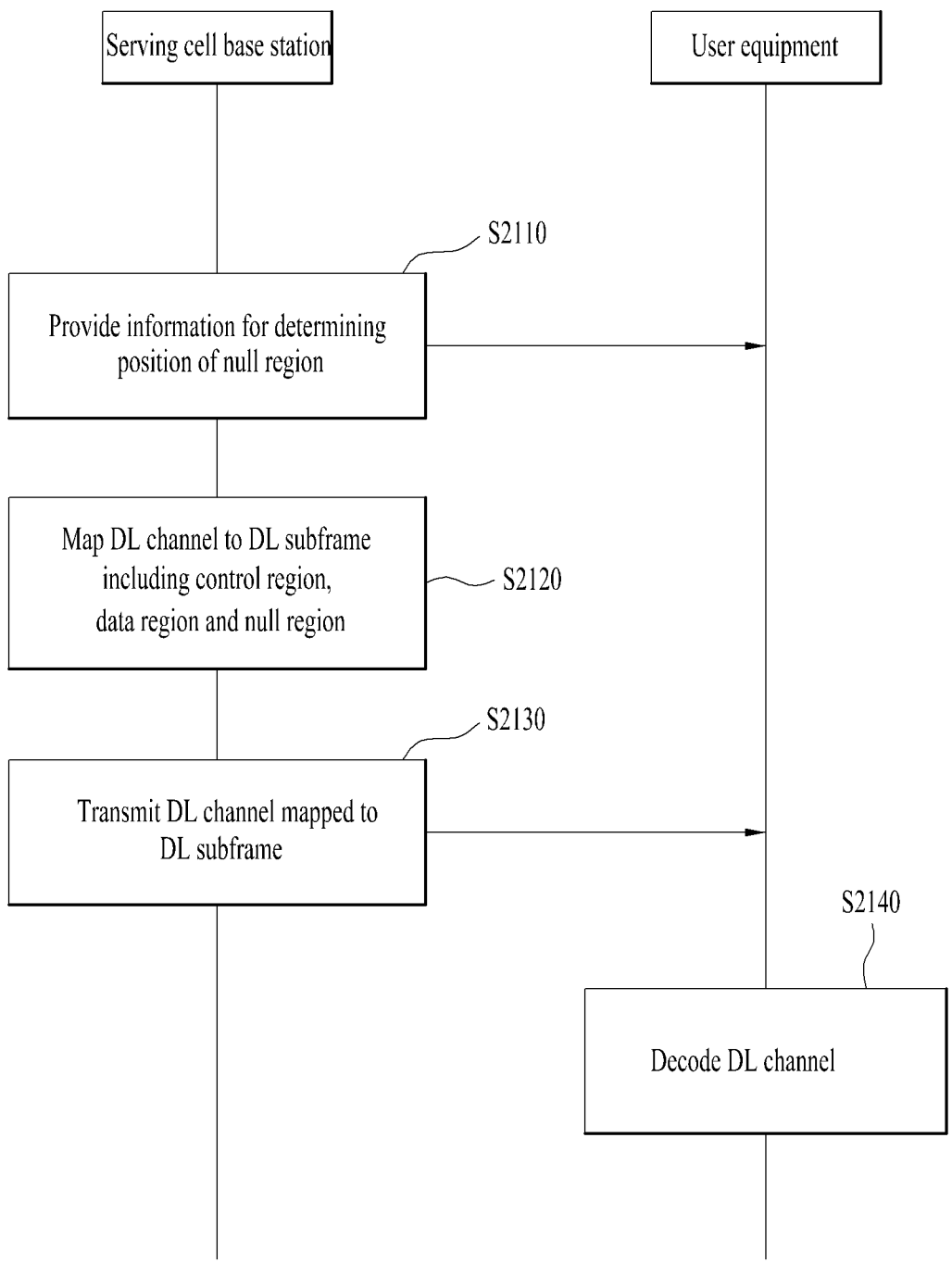
FIG. 21 is a flowchart for a method of transceiving a downlink (DL) subframe including a null region according to one embodiment of the present invention.

FIG. 21 is a flowchart for a method of transceiving a downlink (DL) subframe including a null region according to one embodiment of the present invention.

Referring to FIG. 21, in a step S2110, a base station can provide a user equipment with information for determining a position of a null region included in a DL subframe. In this case, the null region can correspond to one OFDM symbol or a plurality of contiguous OFDM symbols. And, the null region may correspond to a portion or all of a control region of a DL subframe of a neighboring base station. Moreover, the null region may be located at a portion or all of a control region or at a portion of a data region. As mentioned in the foregoing description, the position of the null region may be indirectly determined from an end position of the control region, a start (or end) position of the data region and the like or information on a position and length of the null region may be directly provided. The end position of the control region, the start (or end) position of the data region and the information on the position and length of the null region may be provided through higher layer signaling, may be determined based on information transmitted on PCFICH, PHICH or the like, or may use predetermined values.

In a step S2120, the base station can map a control channel, a data channel and the like in a DL subframe including a control region, a data region and a null region. Although the control channel is generally mapped to the control region, it may be mapped to the data region in some cases. The data channel can be mapped to the data region. In case that PDCCH is mapped to the control region, CCE, to which resource elements corresponding to a control region of a neighboring base station belong, is nullified or the resource elements corresponding to the control region of the neighboring base station may be punctured or nullified. In case that the whole control region is configured as the null region (i.e., in case that a transmission of the control region is not performed), control information for a data transmission may be transmitted on the control channel transmitted in the data region of the corresponding subframe or on a control channel transmitted in a control region or a data region of another DL subframe.

In a step S2130, the base station can transmit the control channel mapped to the DL subframe, the data channel mapped to the DL subframe or both of the control and data channels mapped to the DL subframe to the user equipment.

In a step S2140, the user equipment determines positions of the control, data and null regions of the DL subframe based on the information on the null region received from the base station and may be then able to perform decoding of the DL channel (e.g., control channel and/or data channel) mapped to the DL subframe.

In FIG. 21, a serving cell may include an interfering cell and a neighboring base station may include a base station of an interfered cell. In particular, interference caused to a neighboring cell can be reduced in a manner of configuring a null region in a DL subframe of the interfering cell. Alternatively, In FIG. 21, a serving cell may include an interfered cell and a neighboring base station may include a base station of an interfering cell. In particular, if a null region is configured in a DL subframe of the interfered cell, a neighbor cell can prevent interference from being caused to the serving cell. To this end, the serving cell and the neighboring cell can exchange information on a position of the null region, information on a subframe, in which the interfering cell performs an inter-cell interference coordination (ICIC) operation (e.g., application of CB scheme, silencing, etc.) and the like with each other.

In applying the DL transceiving method shown in FIG. 21, the contents and/or items explained in the descriptions of the various embodiments of the present invention may be independently applicable or at least two embodiments of the present invention may be simultaneously applicable. And, redundant descriptions shall be omitted from the following description for clarity.

Although the operations in the base station (cell) and the user equipment are exemplarily described for clarity in the aforementioned various embodiments of the present invention, the description of the operation in the base station (cell) is identically applicable to an operation in a relay node device as a downlink transmitting entity or a n uplink receiving entity and the description of the operation in the user equipment is identically applicable to a relay node device as an uplink transmitting entity or a downlink receiving entity.

Figure 22:
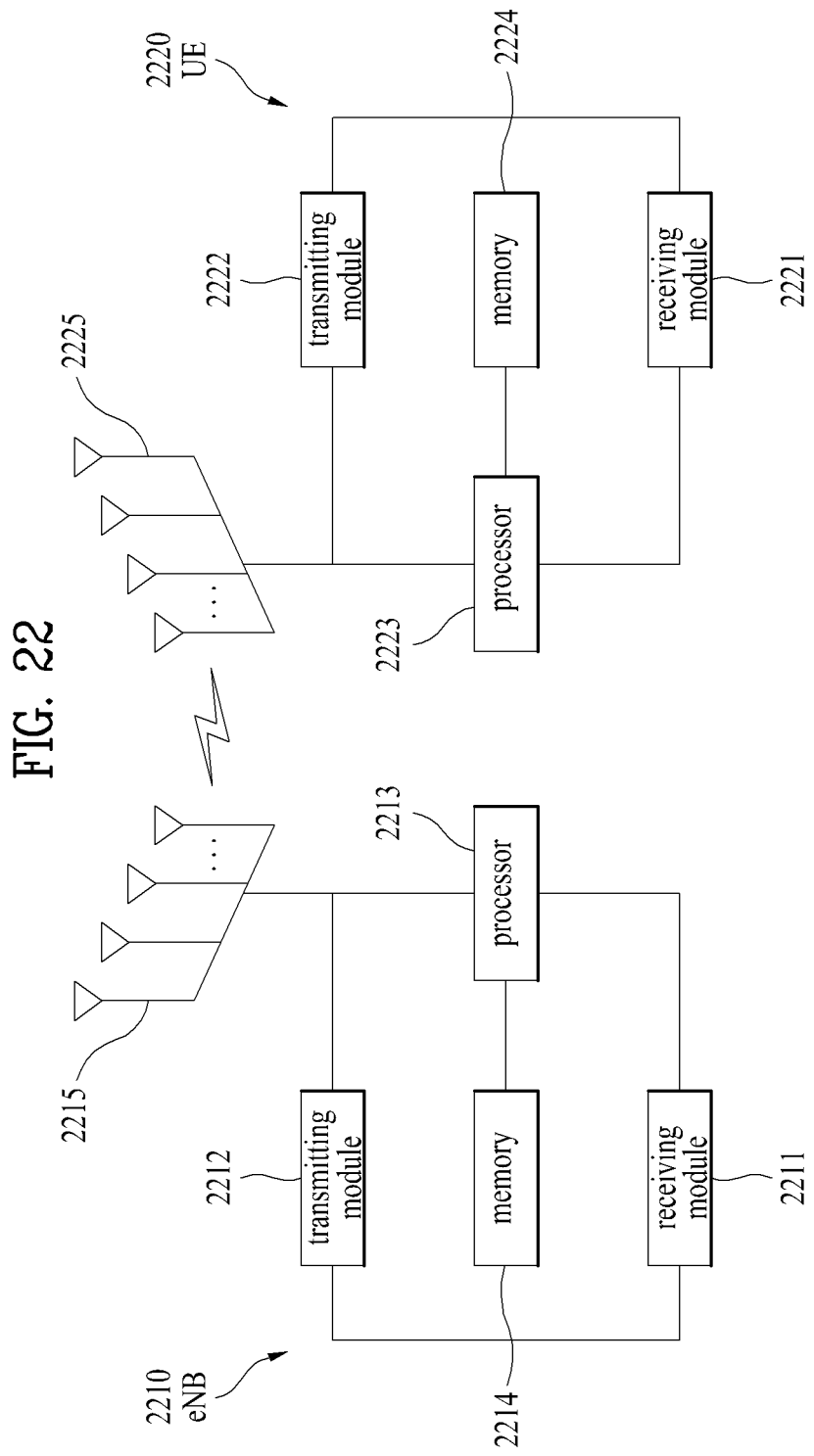
FIG. 22 is a diagram for configurations of a base station device and a user equipment device according to one preferred embodiment of the present invention.

FIG. 22 is a diagram for configurations of a base station device and a user equipment device according to one preferred embodiment of the present invention.

Referring to FIG. 22, a base station device 2210 according to one embodiment of the present invention may include a receiving module 2211, a transmitting module 2212, a processor 2213, a memory 2214 and a plurality of antennas 2215. A plurality of the antennas 2215 may mean a base station device supportive of MIMO transmission and reception. The receiving module 2211 can receive various signals, data and information in uplink from a user equipment. The transmitting module 2212 can transmit various signals, data and information in downlink to the user equipment. And, the processor 2213 can control overall operations of the base station device 2210.

The base station device 2210 according to one embodiment of the present invention can be configured to transmit a DL control channel in a DL subframe including a null region. The processor 2213 of the base station device 2210 can be configured to map at least one of a DL control channel and a DL data channel to a DL subframe including a control region, a data region and a null region. And, the processor 2213 can be configured to transmit at least one of the DL control channel and the DL data channel mapped to the DL subframe to the user equipment via the transmitting module 2212. In this case, the null region can correspond to a portion or all of a control region of a DL subframe of a neighboring base station. And, information for determining a position of the null region may be provided to the user equipment.

The processor 2213 of the base station device 2210 performs functions of operating and processing information received by the base station device 2210, information to be transmitted by the base station device 2210 and the like. The memory 2214 can store the operated and processed information and the like for a prescribed period and can be substituted with such a component as a buffer (not shown in the drawing) and the like.

Referring to FIG. 22, a user equipment device 2220 according to one embodiment of the present invention may include a receiving module 2221, a transmitting module 2222, a processor 2223, a memory 2224 and a plurality of antennas 2225. A plurality of the antennas 2225 may mean a user equipment device supportive of MIMO transmission and reception. The receiving module 2221 can receive various signals, data and information in downlink from a base station. The transmitting module 2222 can transmit various signals, data and information in uplink to the base station. And, the processor 2223 can control overall operations of the user equipment device 2220.

The user equipment device 2220 according to one embodiment of the present invention can be configured to receive a DL channel in a DL subframe including a null region. The processor 2223 of the user equipment device 2220 can be configured to receive information for determining a position of the null region in a DL subframe including a control region, a data region and a null region from the base station via the receiving module 2222. The processor 2223 can be configured to receive at least one of DL control and data channels mapped to the DL subframe from the base station via the receiving module 2222. And, the processor 2213 can be configured to decode at least one of the received DL control channel and the received DL data channel. In this case, the null region may correspond to a portion or all of a control region of a DL subframe of a neighboring base station.

The processor 2223 of the user equipment device 2220 performs functions of operating and processing information received by the user equipment device 2220, information to be transmitted by the user equipment device 2220 and the like. The memory 2224 can store the operated and processed information and the like for a prescribed period and can be substituted with such a component as a buffer (not shown in the drawing) and the like.

In the above-mentioned detailed configurations of the base station device 2210 and the user equipment device 2220, the contents or items explained in the descriptions of the various embodiments of the present invention may be independently applicable or at least two embodiments of the present invention may be simultaneously applicable. And, redundant descriptions shall be omitted from the following description for clarity.

The description of the base station device 2210 with reference to FIG. 22 may be identically applicable to a relay node device as a DL transmitting entity or a UL receiving entity. And, the description of the user equipment device 2220 with reference to FIG. 22 may be identically applicable to a relay node device as a UL transmitting entity or a DL receiving entity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description are applicable to various kinds of mobile communication systems.

What is claimed is:

1. A method of performing a downlink transmission by a base station, comprising:
   receiving, from a neighboring base station, a bitmap indicating an available subframe set;
   determining whether to set a null region in a first downlink subframe on a first carrier based on the bitmap, the null region including one or more contiguous orthogonal frequency division multiplexing (OFDM) symbols;
   mapping at least one of a downlink control channel or a downlink data channel to the first downlink subframe including a control region, a data region and the null region other than the control region;
   shifting the first downlink subframe by at least one OFDM symbol in a time domain, when the first downlink subframe is aligned with a second downlink subframe of the neighboring base station; and
   transmitting the at least one of the downlink control channel or the downlink data channel via the first downlink subframe on the first carrier to a user equipment,
   wherein the null region corresponds to a portion or all of a control region of the second downlink subframe of the neighboring base station,
   wherein the null region locates where the at least one of the control region or the data region of the first downlink subframe had been located before the shift of the first downlink subframe, and
   wherein information for determining a position of the null region is provided to the user equipment.

2. The method of claim 1, wherein the information for determining the position of the null region comprises at least one of:
   first information on an end position of the control region of the first downlink subframe and a length of the null region,
   second information on the end position of the control region and a start position of the data region of the first downlink subframe, or
   third information on the start position of the data region and the length of the null region.

3. The method of claim 2, wherein at least one of the end position of the control region, the start position of the data region, or the length of the null region is determined from the information transmitted to the user equipment via a physical control format indicator channel (PCFICH), a physical hybrid automatic repeat request indicator channel (PHICH), or higher layer signaling.

4. The method of claim 1, wherein:
   a control channel element (CCE), to which resource elements corresponding to the control region of the neighboring base station belong, among resource elements having a physical downlink control channel (PDDCH) of the base station mapped thereto is nullified, or the resource elements corresponding to the control region of the neighboring base station among the resource elements having the PDCCH of the base station mapped thereto are punctured or nullified.

5. The method of claim 1, wherein the null region includes all resources where the control region of the first downlink subframe of the base station had been located before the shift of the first downlink subframe.

6. The method of claim 5, wherein control information for a data transmission of the first downlink subframe of the base station is transmitted on a control channel transmitted in the data region of the first downlink subframe.

7. The method of claim 5, wherein control information for a data transmission of the first downlink subframe of the base station is transmitted on a control channel transmitted in another downlink subframe of the base station.

8. The method of claim 1, wherein the base station corresponds to an interfering cell and wherein the neighboring base station corresponds to an interfered cell.

9. The method of claim 1, wherein the base station corresponds to an interfered cell and wherein the neighboring base station corresponds to an interfering cell.

10. The method of claim 1, wherein information on positions of the control region, the data region and the null region of the first and second downlink subframes of each of the base station and the neighboring base station is exchanged between the base station and the neighboring base station.

11. The method of claim 1, wherein the position of the null region within the first downlink subframe varies according to an amount of the shifting of the first downlink subframe in the time domain with respect to the second downlink subframe.

12. A base station, which performs a downlink transmission, comprising:

a receiver configured to receive an uplink signal from a user equipment;
a transmitter configured to transmit a downlink signal to the user equipment; and
a processor configured to control the base station including the receiver and the transmitter, the processor configured to
  receive, from a neighboring base station, a bitmap indicating an available subframe set,
  determine whether to set a null region in a first downlink subframe on a first carrier based on the bitmap, the null region including one or more contiguous orthogonal frequency division multiplexing (OFDM) symbols,
  map at least one of a downlink control channel or a downlink data channel to the first downlink subframe including a control region, a data region and the null region other than the control region,
  shift the first downlink subframe by at least one OFDM symbol in a time domain, when the first downlink subframe is aligned with a second downlink subframe of the neighboring base station,
  transmit the at least one of the downlink control channel or the downlink data channel via the first downlink subframe on the first carrier to a user equipment,
wherein the null region corresponds to a portion or all of a control region of the second downlink subframe of the neighboring base station
wherein the null region locates where the at least one of the control region or the data region of the first downlink subframe had been located before the shift of the first downlink subframe, and
wherein information for determining a position of the null region is provided to the user equipment.

* * * * *